(12) United States Patent
Randolph et al.

(10) Patent No.: US 12,422,169 B2
(45) Date of Patent: Sep. 23, 2025

(54) GROUNDWATER HEAT EXCHANGER

(71) Applicant: Darcy Solutions, Inc., Excelsior, MN (US)

(72) Inventors: Jimmy Bryan Randolph, Minneapolis, MN (US); Ryan Matthew Martin-Wagar, Missoula, MT (US)

(73) Assignee: Darcy Solutions, Inc., Excelsior, MN (US)

( * ) Notice: Subject to any disclaimer, the term of this patent is extended or adjusted under 35 U.S.C. 154(b) by 132 days.

(21) Appl. No.: 18/042,426

(22) PCT Filed: Aug. 27, 2021

(86) PCT No.: PCT/US2021/047962
§ 371 (c)(1),
(2) Date: Feb. 21, 2023

(87) PCT Pub. No.: WO2022/047163
PCT Pub. Date: Mar. 3, 2022

(65) Prior Publication Data
US 2023/0314047 A1    Oct. 5, 2023

Related U.S. Application Data

(60) Provisional application No. 63/071,507, filed on Aug. 28, 2020.

(51) Int. Cl.
*F24T 10/20* (2018.01)
*F28D 7/10* (2006.01)

(52) U.S. Cl.
CPC .............. *F24T 10/20* (2018.05); *F28D 7/103* (2013.01); *F28D 7/106* (2013.01)

(58) Field of Classification Search
CPC .......... F28D 7/103; F28D 7/106; F24T 10/20
See application file for complete search history.

(56) References Cited

U.S. PATENT DOCUMENTS

| 882,034 | A | 3/1908 | Ward |
| 2,529,062 | A | 11/1950 | Williams |

(Continued)

FOREIGN PATENT DOCUMENTS

| BE | 880 504 A | 4/1980 |
| CN | 2646631 Y | 10/2004 |

(Continued)

OTHER PUBLICATIONS

Translation of KR20160133392A named Translation—KR20160133392A (Year: 2016).*

(Continued)

*Primary Examiner* — Paul Alvare
(74) *Attorney, Agent, or Firm* — Brian D. Kaul; Westman, Champlin & Koehler, P.A.

(57) ABSTRACT

A groundwater heat exchanger includes a distributor, a collector, a plurality of heat exchange pipes, and a housing. The distributor includes a first interior chamber and a first port. The collector includes a second interior chamber and a second port. Each heat exchange pipe includes a first end attached to the distributor and a second end attached to the collector, and defines a fluid passageway between the first and second interior chambers. The housing surrounds the heat exchange pipes and defines a groundwater passageway along the heat exchange pipes that is configured to receive a groundwater flow. In one example, a loop fluid flow received at the first port flows into the first interior chamber, then flows from the first interior chamber to the second interior chamber through the plurality of heat exchange pipes, and flows from the second interior chamber out the second port.

9 Claims, 15 Drawing Sheets

(56) References Cited

U.S. PATENT DOCUMENTS

| | | | |
|---|---|---|---|
| 3,154,148 | A | 10/1964 | Peterson |
| 3,545,412 | A * | 12/1970 | Kinyon ............... F28D 7/1669 |
| | | | 122/483 |
| 3,777,502 | A | 12/1973 | Michie, III et al. |
| 4,448,237 | A | 5/1984 | Riley |
| 4,452,303 | A | 6/1984 | Bontje et al. |
| 4,531,664 | A | 7/1985 | Baski |
| 4,940,087 | A | 7/1990 | Lien et al. |
| 5,379,832 | A | 1/1995 | Dempsey |
| 5,590,715 | A | 1/1997 | Amerman |
| 6,138,744 | A | 10/2000 | Coffee |
| 7,640,974 | B1 | 1/2010 | Hoeptner |
| 8,672,024 | B2 * | 3/2014 | Tyler ................. E21B 36/008 |
| | | | 166/57 |
| 8,820,394 | B2 | 9/2014 | Azzam |
| 9,360,236 | B2 | 6/2016 | Stewart et al. |
| 9,556,856 | B2 | 1/2017 | Stewart et al. |
| 10,401,057 | B2 | 9/2019 | Woods |
| 2010/0288465 | A1 | 11/2010 | Stewart |
| 2012/0103557 | A1 | 5/2012 | Fernandez et al. |
| 2013/0300127 | A1 | 11/2013 | DiNicolantonio |
| 2014/0133519 | A1 | 5/2014 | Freitag |
| 2015/0316294 | A1 * | 11/2015 | Andersson ........ F28D 20/0052 |
| | | | 165/45 |
| 2016/0084591 | A1 | 3/2016 | Crook et al. |
| 2017/0274339 | A1 * | 9/2017 | Moon .................... B01J 8/22 |
| 2017/0274340 | A1 * | 9/2017 | Moon .................... F28F 13/06 |
| 2018/0172318 | A1 | 6/2018 | Woods |
| 2018/0216893 | A1 * | 8/2018 | Vernon .................. B01J 8/008 |
| 2018/0223618 | A1 | 8/2018 | Waldner et al. |
| 2022/0018555 | A1 | 1/2022 | Cho et al. |
| 2022/0018577 | A1 | 1/2022 | Randolph et al. |
| 2023/0314047 | A1 | 10/2023 | Randolph et al. |

FOREIGN PATENT DOCUMENTS

| | | |
|---|---|---|
| CN | 2906418 Y | 5/2007 |
| CN | 101074792 A | 11/2007 |
| CN | 103090594 A | 5/2013 |
| CN | 103388934 A | 11/2013 |
| CN | 206648350 U | 11/2017 |
| CN | 106 767 008 B | 10/2018 |
| DE | 29 31 485 A1 | 2/1981 |
| DE | 31 49 636 A1 | 7/1983 |
| DE | 202006019801 U1 | 5/2007 |
| DE | 10 2014 104992 A1 | 10/2015 |
| EP | 0045993 A1 | 2/1982 |
| EP | 0499466 A2 | 8/1992 |
| EP | 1084373 B1 | 11/2002 |
| EP | 1865146 A1 | 12/2007 |
| JP | 2005049016 A | 2/2005 |
| JP | 2009092350 A | 4/2009 |
| JP | 2014025688 A | 2/2014 |
| JP | 2014115016 A | 6/2014 |
| JP | 2015025612 A | 2/2015 |
| JP | 2015218935 A | 12/2015 |
| JP | 2016070597 A | 5/2016 |
| JP | 2017067419 A | 4/2017 |
| KR | 100759403 B1 | 9/2007 |
| KR | 20090128722 A | 12/2009 |
| KR | 101169673 B1 | 8/2012 |
| KR | 20140052456 A | 5/2014 |
| KR | 1020140062639 A | 5/2014 |
| KR | 101498932 B1 | 3/2015 |
| KR | 20160133392 A * | 10/2016 |
| KR | 20160133392 | 11/2016 |
| KR | 101 733 027 B1 | 5/2017 |
| KR | 101792145 B1 | 11/2017 |
| KR | 20180043735 A | 4/2018 |
| KR | 101984988 B1 | 5/2019 |
| SE | 502 610 C2 | 11/1995 |
| WO | 2010022354 A1 | 2/2010 |
| WO | 2011023311 A2 | 3/2011 |
| WO | 2012008992 A1 | 1/2012 |
| WO | 2012066403 A1 | 5/2012 |
| WO | 2012166650 A1 | 12/2012 |
| WO | 2020117946 A1 | 6/2020 |
| WO | 2022047163 A1 | 3/2022 |
| WO | 2022072343 A1 | 4/2022 |

OTHER PUBLICATIONS

Extended European Search Report from European Patent Application No. 21876293.8, dated Aug. 16, 2024.

Communication pursuant to Rule 164(1) EPC from European Patent Application No. 21862828.7, dated Jul. 26, 2024.

Notification of Transmittal of the International Search Report and Written Opinion dated Jun. 15, 2023 of PCT/US2023/015508, filed Mar. 17, 2023.

Extended European Search Report from European Patent Application No. 21862828.7, dated Oct. 24, 2024.

Office Action from Canadian Patent Application No. 3,193,648, dated Sep. 24, 2024.

Office Action from Canadian Patent Application No. 3,198, 196, dated Sep. 25, 2024.

Office Action from Canadian Patent Application No. 3,121,511, dated Sep. 26, 2024.

Communication pursuant to Article 94(3) EPC from European Patent Application No. 19828095.0, dated Nov. 11, 2024.

Communication pursuant to Rules 70(2) and 70a(2) EPC from European Patent Application No. 21862828.7 dated Nov. 12, 2024.

Communication pursuant to Article 94(3) EPC for European Patent Application No. 19828095.0 dated Aug. 10, 2023.

Notification of Transmittal of the International Search Report and Written Opinion dated Dec. 20, 2021 of PCT/US2021/047962, filed Aug. 27, 2021.

Notification of Transmittal of the International Search Report and Written Opinion dated Jan. 11, 2022 of PCT/US2021/052397, filed Sep. 28, 2021.

Notification of Transmittal of the International Search Report and Written Opinion dated Mar. 13, 2020 of PCT/US2019/064490, filed Dec. 4, 2019.

Communication pursuant to Rules 161(1) and 162 EPC from European Patent Application No. 19828095.0 dated Jul. 14, 2021.

Naylor et al., "Geothermal Ground Source Heat Pumps and Geology in Indiana" Indiana Geological and Water Survey; Indiana University, publication date: Unknown. Retrieved from https://igws.indiana.edu/Geothermal/HeatPumps on May 28, 2021.

Michiya Suzuki et al. "Development of a spiral type heat exchanger for ground source heat pump system" Energy Procedia 96 (2016) 503-510; available online at www.sciencedirect.com.

Diao et al. "Heat transfer in ground heat exchangers with groundwater advection" International Journal of Thermal Sciences; vol. 43, Issue 12, Dec. 2004, pp. 1203-1211.

Casasso et al. "Efficiency of closed loop geothermal heat pumps: A sensitivity analysis" Renewable Energy vol. 62, Feb. 2014, pp. 737-746.

Stefano Lo Russo, Cesare Boffa, Massimo V. Civita, "Low-enthalpy geothermal energy: An opportunity to meet increasing energy needs and reduce CO2 and atmospheric pollutant emissions in Piemonte, Italy, Geothermics", vol. 38, Issue 2,2009,pp. 254-262,ISSN 0375-6505,https://doi.org/10.1016/j.geothermics.2008.07.005. (https://www.sciencedirect.com/science/article/pii/S037565050800045X).

Jozsef Hecht-Méndez et al. "Optimization of energy extraction for vertical closed-loop geothermal systems considering groundwater flow", Energy Conversion and Management, vol. 66, 2013, pp. 1-10, ISSN 0196-8904, https://doi.org/10.1016/j.enconman.2012.09.019. (https://www.sciencedirect.com/science/article/pii/S019689041200369X).

A. Angelotti et al. "Energy performance and thermal impact of a Borehole Heat Exchanger in a sandy aquifer: Influence of the groundwater velocity", Energy Conversion and Management, vol. 77, 2014, pp. 700-708, ISSN 0196-8904,https://doi.org/10.1016/j.enconman.2013.10.018. (https://www.sciencedirect.com/science/article/pii/S0196890413006535).

(56) References Cited

OTHER PUBLICATIONS

Huajun Wang et al. "Thermal performance of borehole heat exchanger under groundwater flow: A case study from Baoding", Energy and Buildings, vol. 41, Issue 12, 2009, pp. 1368-1373, ISSN 0378-7788, https://doi.org/10.1016/j.enbuild.2009.08.001. (https://www.sciencedirect.com/science/article/pii/S0378778809001820).

Nelson Molina-Giraldo et al., "A moving finite line source model to simulate borehole heat exchangers with groundwater advection", International Journal of Thermal Sciences, vol. 50, Issue 12, 2011, pp. 2506-2513, ISSN 1290-0729, https://doi.org/10.1016/j.ijthermalsci.2011.06.012. (https://www.sciencedirect.com/science/article/pii/S129007291100192X).

Funabiki, A., Oguma, M., Yabuki, T., and Kakizaki, T., 2014, "The Effects of Groundwater Flow on Vertical-Borehole Ground Source Heat Pump Systems," ASME Paper No. ESDA2014-20065.

Goetzler, William, Zogg, Robert, Lisle, Heather, and Burgos, Javier. Ground-Source Heat Pumps. Overview of Market Status, Barriers to Adoption, and Options for Overcoming Barriers. United States: N. p., 2009. Web doi:10.2172/1219308.

Communication pursuant to Rules 161(2) and 162 EPC dated Apr. 4, 2023, for corresponding European Application No. 21862828.7, 4 pages.

Communication pursuant to Rules 161(2) and 162 EPC dated May 10, 2023, for corresponding European Application No. 21876293.8, 3 pages.

Extended European Search Report from European Patent Application No. 237714530., dated May 19, 2025.

Canadian Office Action dated Jun. 3, 2025 for corresponding Canadian Application No. 3,193,648.

\* cited by examiner

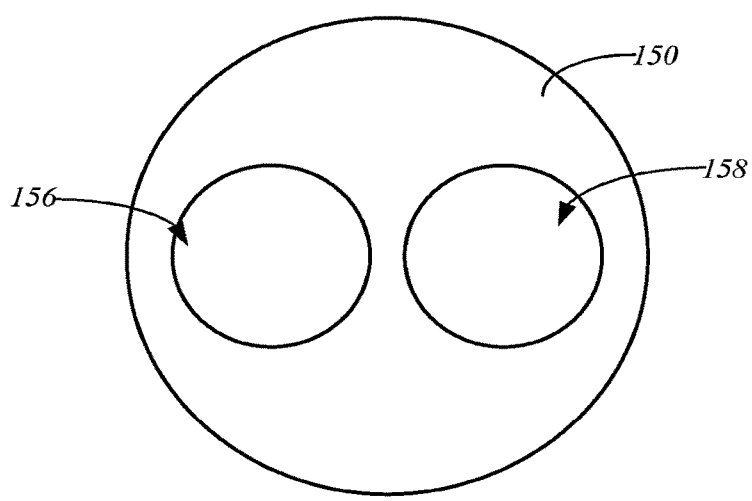
FIG. 10
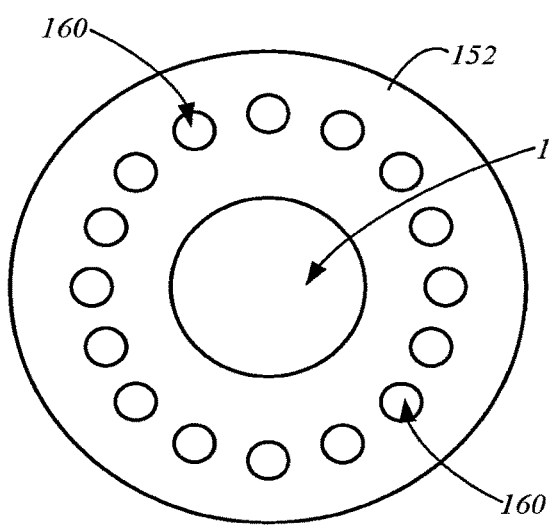 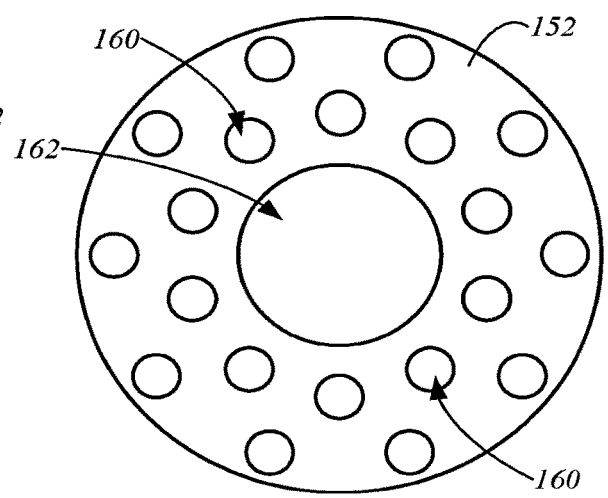
FIG. 11A                FIG. 11B

GROUNDWATER HEAT EXCHANGER

CROSS-REFERENCE TO RELATED APPLICATION

This Application is a Section 371 National Stage Application of International Application No. PCT/US2021/047962, filed Aug. 27, 2021 and published as WO 2022/047163 A1 on Mar. 3, 2022, in English, which claims the benefit of U.S. Provisional Application Ser. No. 63/071,507 which was filed Aug. 28, 2020; the contents of all of which are hereby incorporated by reference in their entirety.

FIELD

Embodiments of the present disclosure are generally related to groundwater heat exchangers that are configured for submersion within groundwater, such as in a well or a borehole, and may be used by a heating and/or cooling system.

BACKGROUND

Heating and cooling systems generally move thermal energy from one location to another, such as moving thermal energy from a heat source to a heat sink (for example, a region of higher temperature to a region of lower temperature), or from a heat sink to a heat source (for example, a region of lower temperature to a region of higher temperature). Some heating and cooling systems utilize a heat pump. Heat pumps perform a refrigeration cycle using a circulating refrigerant to move heat through evaporation (heat absorption) and condensation (heat rejection) phases. The evaporation and condensation phases of the refrigerant typically takes place in two different units called the evaporator and condenser, respectively. In a heat pump, the evaporator is switched to be a condenser and vice versa depending on whether cooling or heating is required.

Geothermal or ground source heat pumps use the earth as a heat source or heat sink. A heat exchanger is positioned underground to provide cooling by using the earth as a heat sink, or to provide heating by using the earth as a heat source. The ground loops of most traditional geothermal heat pump systems focus on heat exchange via conduction with subsurface rocks and sediments, and do not systematically take advantage of heat exchange with flowing or stationary groundwater.

PCT publication number WO2020/117946, which is incorporated herein by reference in its entirety, discloses a groundwater enhanced geothermal heat pump that utilizes a heat exchanger within a well, a geothermal borehole, etc., to exchange heat with the earth and/or groundwater. The well, borehole, etc., may be installed vertically, horizontally, or at any angle between, and it may be cased with pipe, uncased, partially cased, screened, unscreened, or any combination thereof.

SUMMARY

Embodiments of the present disclosure generally include groundwater heat exchangers, systems that include the groundwater heat exchangers, and methods of operating the groundwater heat exchangers. One embodiment of the groundwater heat exchanger includes a distributor, a collector, a plurality of heat exchange pipes, and a housing. The distributor includes a first interior chamber and a first port. The collector includes a second interior chamber and a second port. Each heat exchange pipe includes a first end attached to the distributor and a second end attached to the collector, and defines a fluid passageway between the first and second interior chambers. The housing surrounds the heat exchange pipes and defines a groundwater passageway along the heat exchange pipes that is configured to receive a groundwater flow. In one example, a loop fluid flow received at the first port flows into the first interior chamber, then flows from the first interior chamber to the second interior chamber through the plurality of heat exchange pipes, and flows from the second interior chamber out the second port.

The housing may include a plurality of containment pipes. Each of the heat exchange pipes extends through one of the containment pipes. A gap between each heat exchange pipe and the containment pipe through which it extends forms a portion of the groundwater passageway.

The housing may include a first plate having a plurality of first sockets and a plurality of first openings through the first plate. Each first opening is substantially concentric to one of the first sockets. A first end of each of the containment pipes is received within one of the first sockets. The first end of each of the heat exchange pipes extends through one of the containment pipes and one of the first openings. A second plate of the housing includes a plurality of second sockets and a plurality of second openings through the second plate. Each second opening is substantially concentric to one of the second sockets. A second end of each of the containment pipes is received within one of the second sockets. The second end of each of the heat exchange pipes extends through one of the containment pipes and one of the second openings.

The groundwater heat exchanger may include one or more spacers positioned within each gap. Each spacer is configured to position the containment pipe in substantially concentric alignment with the heat exchange pipe extending therethrough.

The groundwater heat exchanger may include a pipe that is connected to the second port and extends through the housing and the first interior chamber of the distributor.

The groundwater heat exchanger may include a first cable tube extending through the first interior chamber of the distributor, and a second cable tube extending through the second interior chamber of the collector.

The groundwater heat exchanger may contain the collector within the housing.

The housing of the groundwater heat exchanger may have a first end and a second end. A pump of the heat exchanger may be configured to drive a groundwater flow such that it travels from the second end of the housing through the groundwater passageway along the heat exchange pipes, and out the first end of the housing.

The groundwater heat exchanger may include a groundwater feed pipe that is supported by the collector and extends away from the distributor. The pump may be configured to drive the groundwater flow into the second end of the housing through the groundwater feed pipe.

One embodiment of a system includes the groundwater heat exchanger formed in accordance with one or more embodiments of the present disclosure, and a loop fluid pump configured to drive a loop fluid flow through the first port, the first interior chamber, the plurality of heat exchange pipes, the second interior chamber and the second port.

Another embodiment of the groundwater heat exchanger includes a first tube structure, a second tube structure extending within the first tube structure, a third tube structure extending within the second tube structure, and a fourth tube structure extending within the third tube structure. A first channel is formed between the first tube structure and the second tube structure, a second channel is formed between the second tube structure and the third tube structure, a third channel is formed between the third tube structure and the fourth tube structure, and a fourth channel is formed within the fourth tube structure. The second and fourth channels are fluidically coupled together at a first end of the second and fourth tube structures.

A second end of the second tube structure may include a first interior chamber and a first port to the first interior chamber. The second channel is open to the first interior chamber.

A first end of the second tube structure may include a second interior chamber. The second and fourth channels are open to the second interior chamber.

A second end of the fourth tube structure and the fourth channel may extend through the first interior chamber to a second port.

The first tube structure, the second tube structure, the third tube structure and the fourth tube structure may include sections that are substantially concentric to each other.

The groundwater heat exchanger may include a pump that is configured to drive a groundwater flow through the first and third channels.

A system may include the groundwater heat exchanger and a loop fluid pump configured to drive a loop fluid flow through the first port, the first interior chamber, the second channel, the second interior chamber, the fourth channel and the second port.

In one embodiment of a method of operating a heat exchanger formed in accordance with embodiments of the present disclosure, to exchange heat between a loop fluid flow and groundwater, the groundwater heat exchanger is provided within a borehole. A loop fluid flow is driven through loop fluid passageways of the heat exchanger using a loop fluid pump. A groundwater flow is driven through groundwater passageways of the heat exchanger using a groundwater pump. Heat is transferred between the groundwater flow and the loop fluid flow.

In one embodiment of the method, the groundwater heat exchanger may include a distributor, a collector, a plurality of heat exchange pipes, a housing and a pump. The distributor includes a first interior chamber and a first port to the first interior chamber. The collector includes a second interior chamber and a second port to the second interior chamber. Each heat exchange pipe includes a first end attached to the distributor and a second end attached to the collector, and defines one of the loop fluid passageways between the first and second interior chambers. The housing includes a plurality of containment pipes, wherein each of the plurality of heat exchange pipes extends through one of the containment pipes. A gap between each heat exchange pipe and the containment pipe through which it extends forms a portion of the groundwater passageway. The loop fluid flow is driven through the distributor, the plurality of heat exchange pipes, and the collector using the loop fluid pump. The groundwater flow is driven through the groundwater passageway using the groundwater pump. Heat is transferred between the loop fluid flow traveling through the plurality of heat exchange pipes and the groundwater flow traveling through the groundwater passageway.

The housing of the groundwater heat exchanger may include a first plate having a plurality of first sockets and a plurality of first openings through the first plate. Each first opening is substantially concentric to one of the first sockets. A first end of each of the containment pipes is received within one of the first sockets. The first end of each of the heat exchange pipes extends through one of the first openings. The housing may also include a second plate having a plurality of second sockets and a plurality of second openings through the second plate. Each second opening is substantially concentric to one of the second sockets. A second end of each of the containment pipes is received within one of the second sockets. The second end of each of the heat exchange pipes extends through one of the second openings.

The heat exchanger may also include one or more spacers within each gap. Each of the spacers is configured to position the containment pipe in substantially concentric alignment with the heat exchange piped extending therethrough.

In another embodiment of the method, the groundwater heat exchanger includes a first tube structure, a second tube structure extending within the first tube structure, a third tube structure extending within the second tube structure, and a fourth tube structure extending within the third tube structure. A first channel is formed between the first tube structure and the second tube structure, a second channel is formed between the second tube structure and the third tube structure, a third channel is formed between the third tube structure and the fourth tube structure, and a fourth channel is formed within the fourth tube structure. The second and fourth channels are fluidically coupled together at a first end of the second and fourth tube structures. The loop fluid passageway includes the second and fourth channels, and the groundwater passageway includes the first and third channels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 10 is a top plan view of an example of a top plate of a distributor, in accordance with embodiments of the present disclosure.

FIGS. 11A and 11B are top plan views of examples of a bottom plate of a distributor, in accordance with embodiments of the present disclosure.

DETAILED DESCRIPTION OF ILLUSTRATIVE EMBODIMENTS

Figure 1:
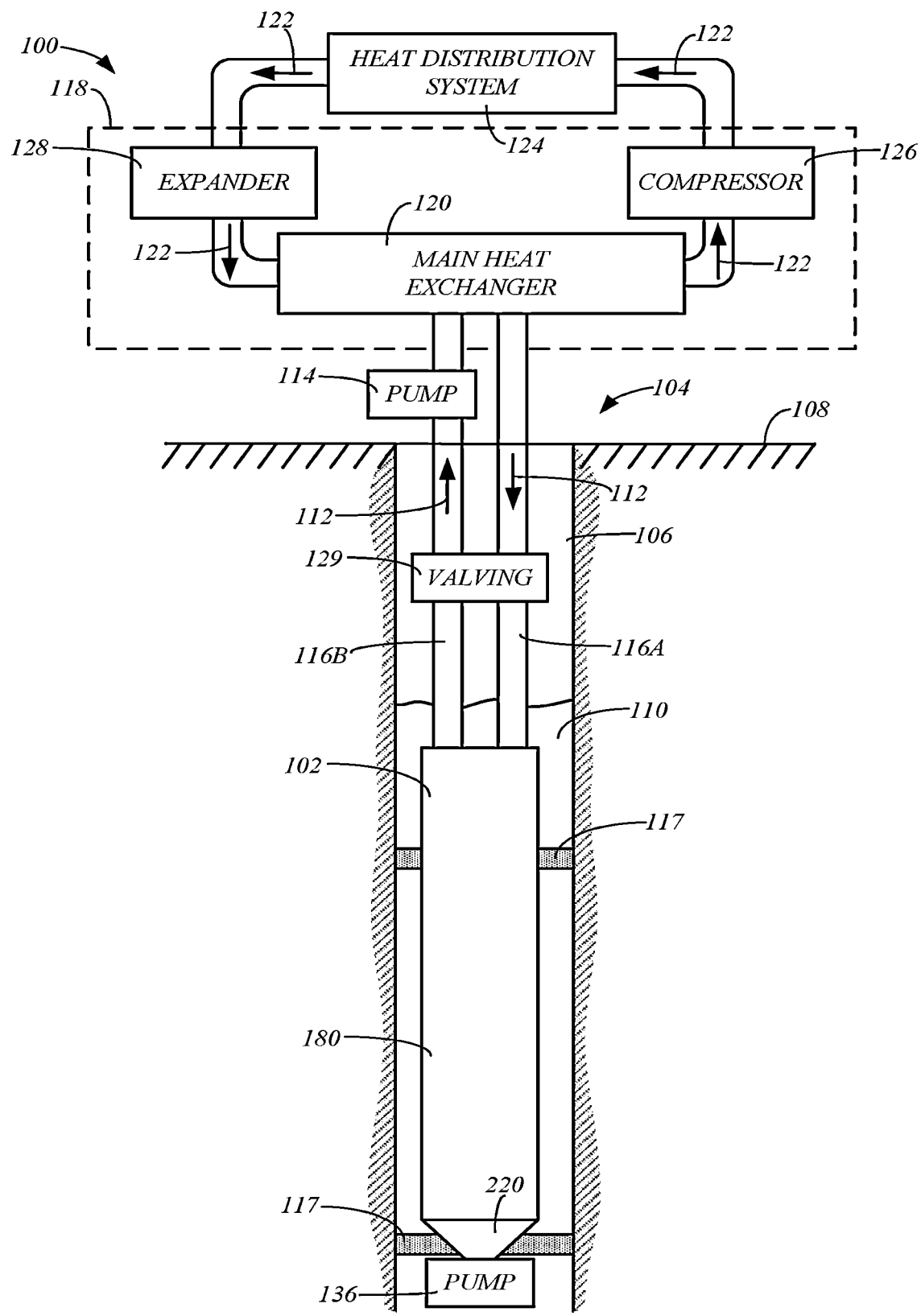
FIG. 1 is a simplified diagram of a system that includes a groundwater heat exchanger, in accordance with embodiments of the present disclosure.

Embodiments of the present disclosure generally relate to groundwater heat exchangers that are configured for use in heating and cooling systems, such as a geothermal heat pump system, and may be configured for use within wells or geothermal boreholes to exchange heat with the earth and/or groundwater. The interaction between the heat exchanger and groundwater enhances heat exchange, such as through convective and advective heat exchange.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or may be shown in block diagram form in order to not obscure the embodiments in unnecessary detail.

FIG. 1 is a simplified diagram of a system 100, such as a geothermal heat pump system, having a groundwater heat exchanger 102, formed in accordance with one or more embodiments of the present disclosure. The system 100 generally includes a ground loop 104 that extends into a vertical borehole or well 106 (hereinafter "borehole") below the ground surface 108. The borehole 106 may penetrate one or more aquifers or groundwater zones whereby groundwater 110 is present in the borehole 106, such as described in the above-referenced PCT application. The borehole 106 may have a diameter of approximately 3-24 inches, such as 4, 6 or 8 inches, for example. If a well is used, it may be formed much larger than a typical borehole.

The ground loop 104 includes at least one of the groundwater heat exchangers 102 formed in accordance with one or more embodiments described herein. The heat exchanger 102 is positioned within the borehole 106 such that it is submerged within the groundwater 110. A loop fluid flow 112 (e.g., water, refrigerant, etc.) that may be driven by a loop pump 114 through piping 116 of the ground loop 104, such as pipes 116A and 116B, and the groundwater 110 within the borehole 106. The loop fluid flow 112 is driven through the heat exchanger 102, which operates to exchange heat between the loop fluid flow 112 and the groundwater 110.

One or more packers 117 may be used to secure the heat exchanger 102 within the borehole 106, as shown in FIG. 1. Such packers may also seal off lower sections of the borehole 106 from upper sections. The packers 117 may be designed to allow power cables and other wires (e.g., sensor wires) to pass through.

In one embodiment, the piping 116 of the ground loop 104 forms a closed loop of piping, and does not extract groundwater or carry groundwater to the surface. Separate piping (not shown) may be used to capture and return subsurface groundwater 110 to the surface for use (e.g., consumption).

The pipes 116A and 116B that extend below the surface 108 may be thermally insulated to reduce heat exchange with their surroundings and isolating the heat exchange with the fluid flow 112 to the one or more groundwater heat exchangers 102. Thus, rather than providing heat exchange along nearly the entire length of the borehole 106, embodiments of the system 100 provides heat exchange with the groundwater 110 at the one or more groundwater heat exchangers 102 within the borehole 106.

The system 100 may comprise a heat pump 118 that includes a main heat exchanger 120 that is configured to exchange heat between a fluid flow 122 (e.g., water, refrigerant, etc.), which also flows through a heat distribution system 124, and the loop fluid flow 112, as indicated in FIG. 1, using any suitable technique. The heat distribution system 124 may use the fluid flow 122 to provide heating or cooling for a water heater, an HVAC, a chiller, a heat recovery chiller, or another device in accordance with conventional techniques. Alternatively, the system 100 may operate without the main heat exchanger 120, and utilize the loop fluid flow 112 to directly heat or cool a desired medium.

The heat pump 118 may also include conventional heat pump components, such as a compressor 126, an expander 128, and/or other conventional components, as shown in FIG. 1, to perform a desired heat pump cycle. While the compressor 126 and the expander 128 are illustrated as performing a heating cycle based on the direction of the fluid flow 122, it is understood that the direction of the fluid flow 122 may be reversed to perform a cooling cycle.

In some embodiments, control and/or balancing valving 129 may be connected to the pipes 116 at a location between the heat exchanger 102 and the heat pump 118 or heat distribution system 124, as indicated in FIG. 1. The valving 129 may be mechanically or electronically controlled, and may be used to match heating and/or cooling load demand from the heat distribution system 124 with the supply from the heat exchanger 102, for example. The valving 129 may include a bypass connecting the pipes 116A and 116B that may be used to provide additional control of the loop fluid flow 112.

Figure 2:
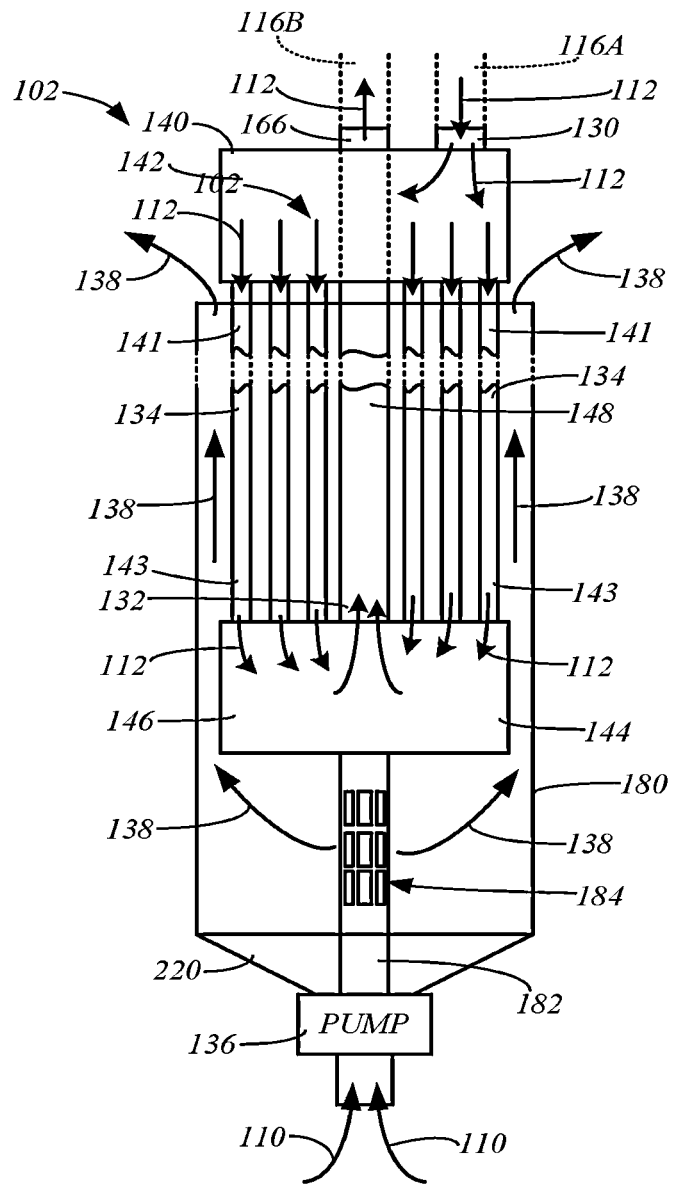
FIG. 2 is a simplified diagram of an example of a groundwater heat exchanger, in accordance with embodiments of the present disclosure.

FIG. 2 is a simplified diagram of a groundwater heat exchanger 102, in accordance with embodiments of the present disclosure. The heat exchanger 102 generally receives the loop fluid flow 112, such as through the pipe 116A, at a port 130, and discharges the loop fluid flow 112 to the pipe 116B through a port 132, to return the loop fluid flow 112, for example, to the heat pump 118.

In one embodiment, the heat exchanger 102 circulates the loop fluid flow 112 received at the port 130 to one or a plurality of heat exchange pipes 134, such as more than 3 pipes, more than 5 pipes, more than 10 pipes, or more than 15 pipes, for example. The heat exchanger 102 may include one or more pumps 136 or other means of inducing or driving a flow 138 of the groundwater 110 (FIG. 1) around the pipes 134. This allows for heat exchange between the loop fluid flow 112 and the groundwater flow 138 before the loop fluid flow 112 is returned to the heat exchange components of the system 100, such as the heat pump 118. In other embodiments, the heat exchanger 102 may not utilize a pump 136 to drive the groundwater flow 138, and rely instead on natural groundwater currents and/or convection to drive the groundwater flow or flows 138 through the heat exchanger 102. It is understood that the illustrated flows 112 and 138 may be reversed from directions shown in FIGS. 1 and 2.

Figure 3:
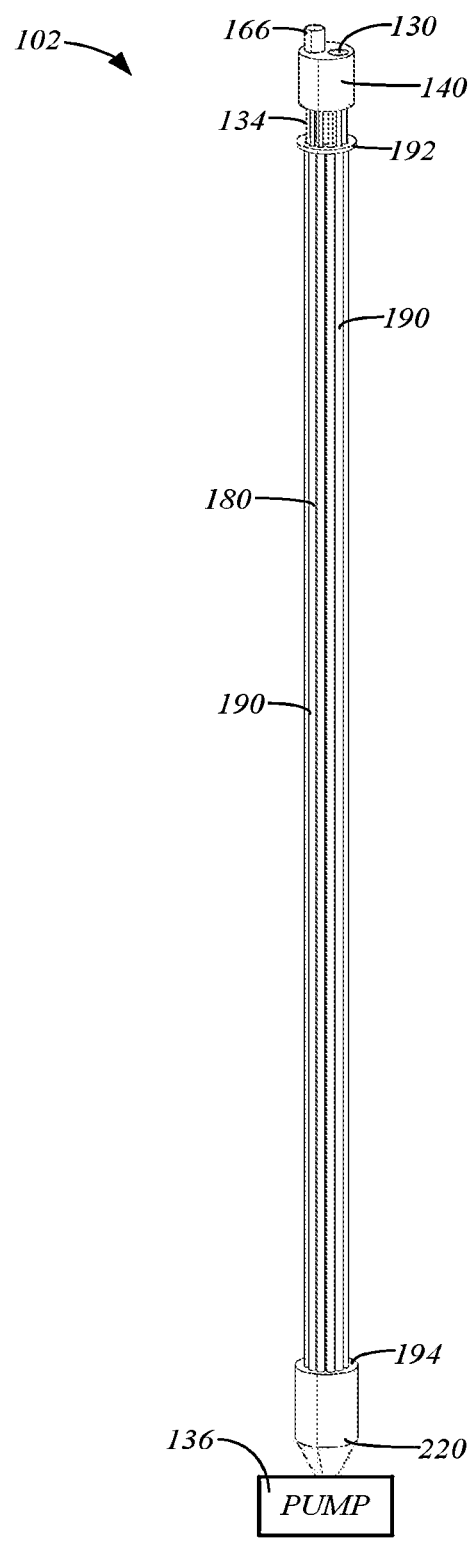
FIG. 3 is an isometric view of an example of a groundwater heat exchanger, in accordance with embodiments of the present disclosure.
Figure 4:
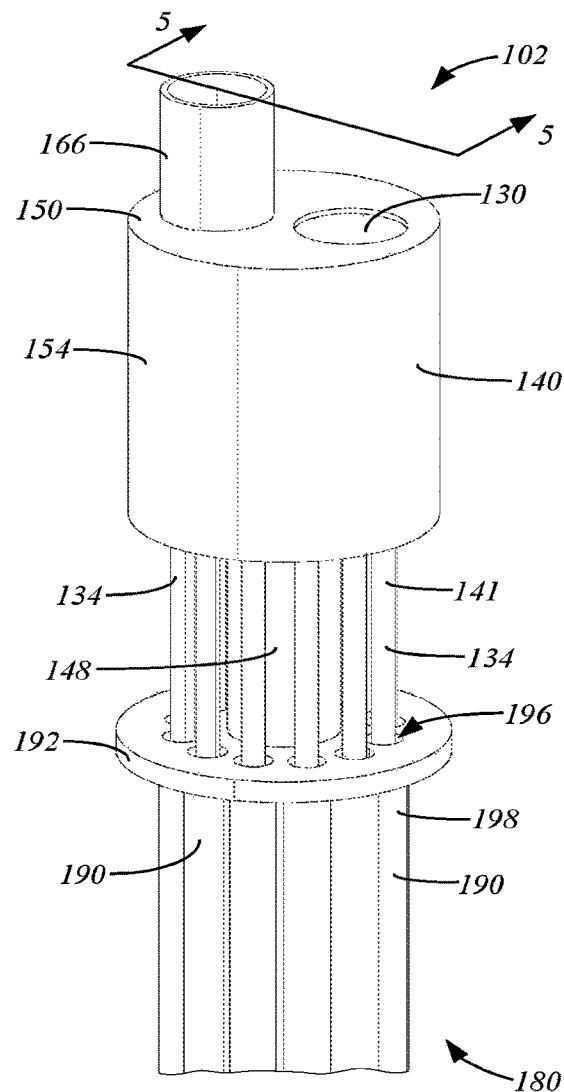
FIG. 4 is an isometric view of a top portion of the groundwater heat exchanger of FIG. 3, in accordance with embodiments of the present disclosure.
Figure 6:
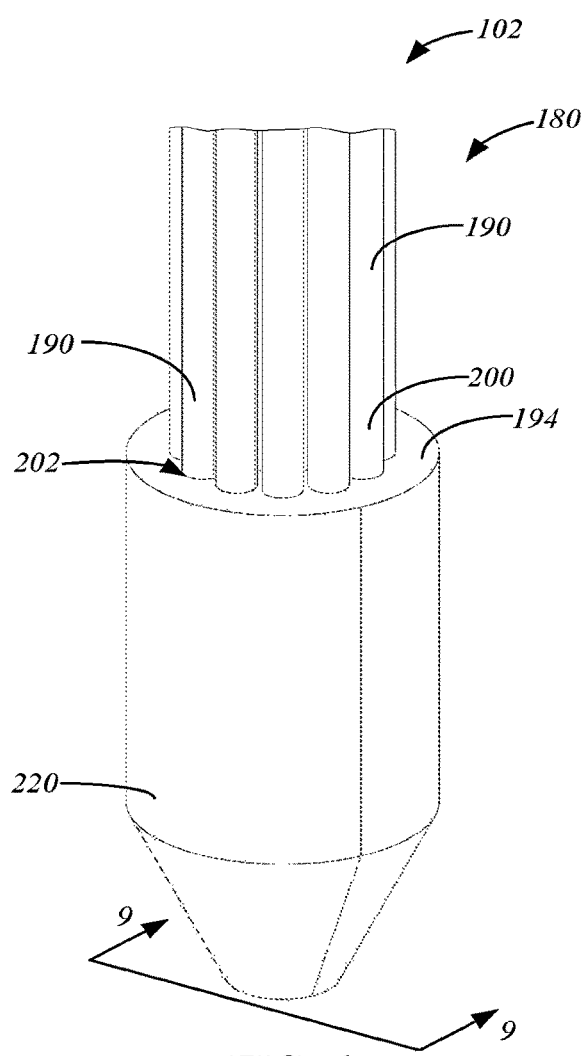
FIG. 6 is a top isometric view of a bottom portion of the groundwater heat exchanger of FIG. 3, in accordance with embodiments of the present disclosure.
Figure 5:
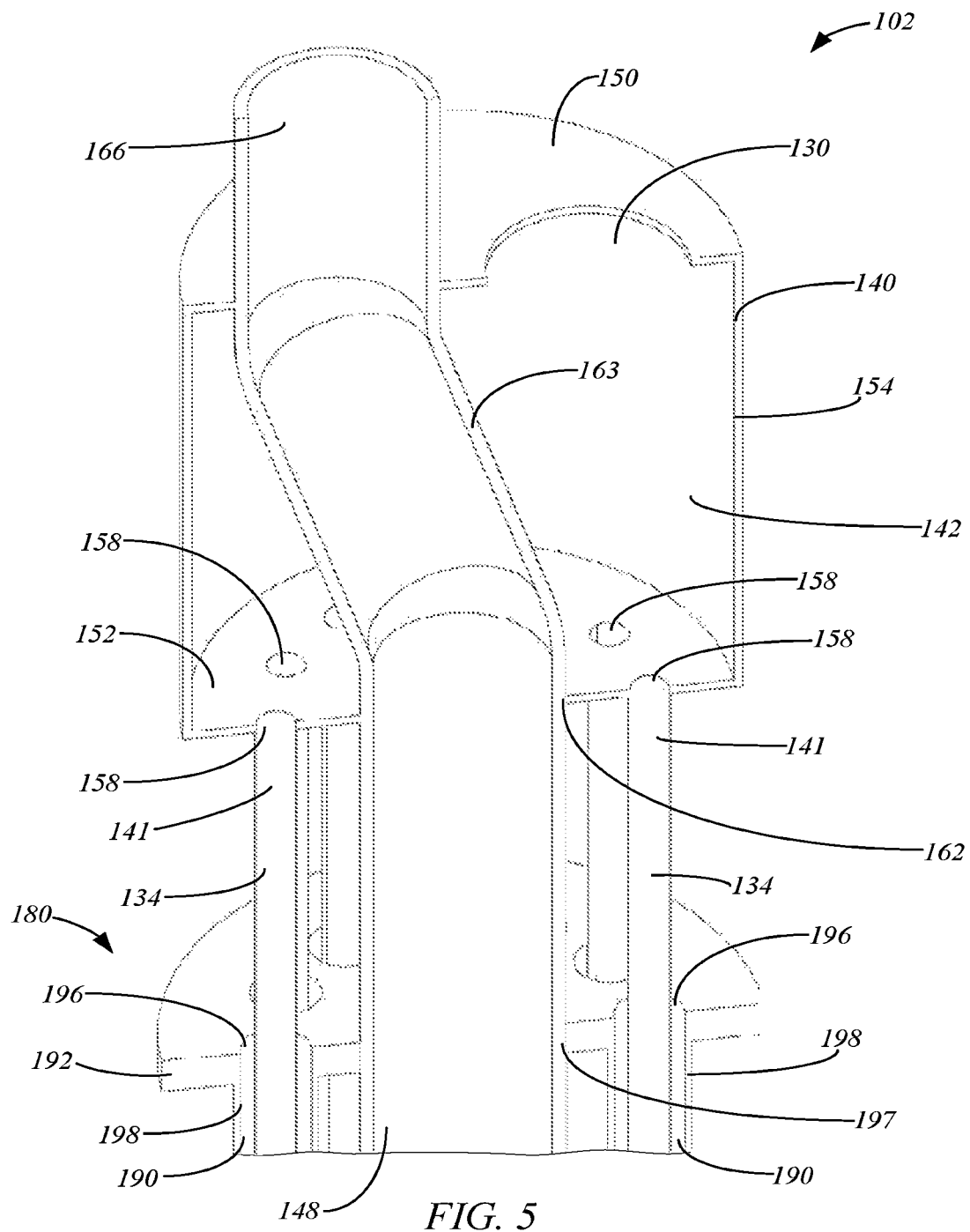
FIG. 5 is an isometric cross-sectional view of a top portion of the groundwater heat exchanger shown in FIG. 4 taken generally along line 5-5, in accordance with embodiments of the present disclosure.
Figure 7:
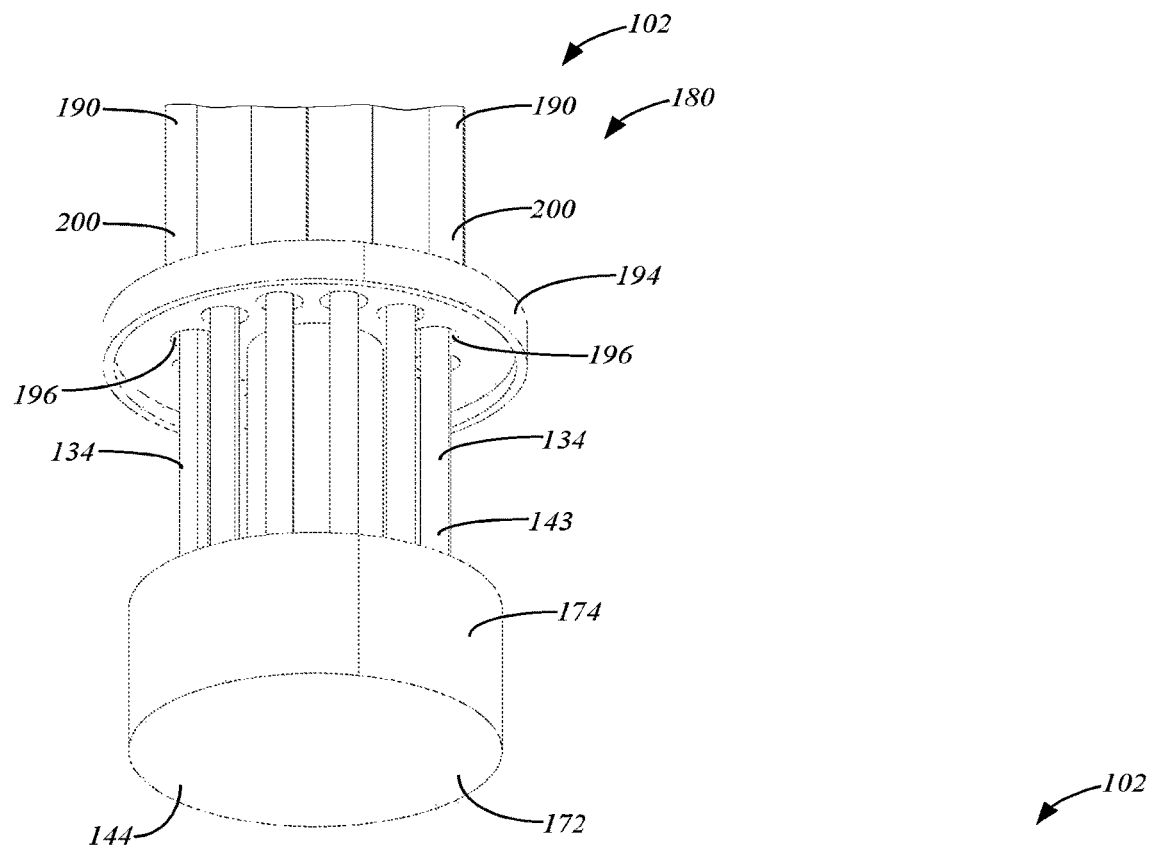
FIGS. 7 and 8 respectively are bottom and top isometric views of the bottom portion of the groundwater heat exchanger of FIG. 3 with a portion of a housing removed, in accordance with embodiments of the present disclosure.
Figure 8:
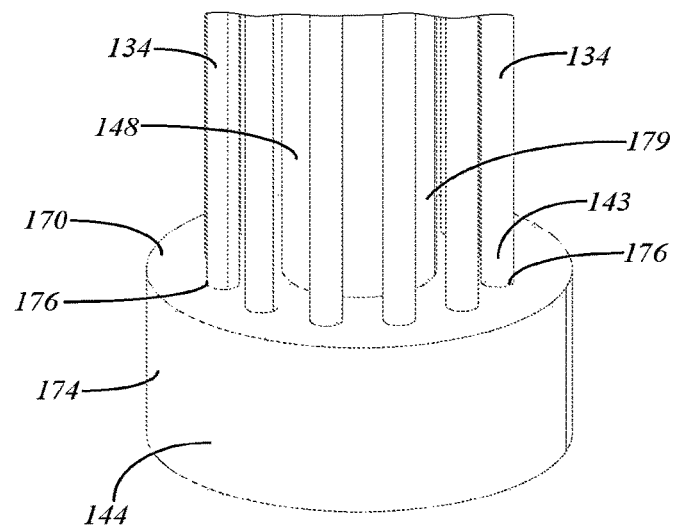
Figure 9:
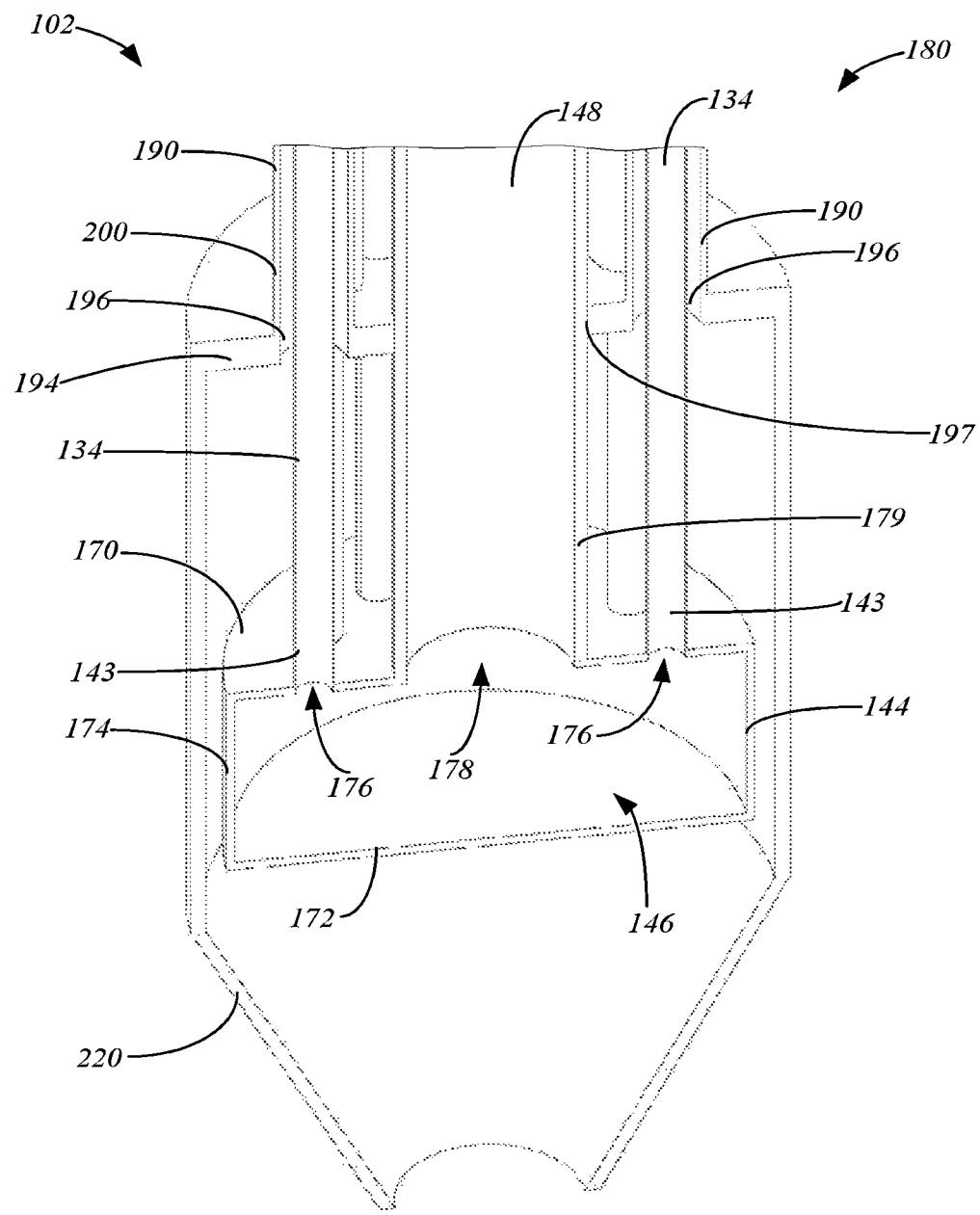
FIG. 9 is an isometric cross-sectional view of the bottom portion of the heat exchanger of FIG. 6 taken generally along line 9-9, in accordance with embodiments of the present disclosure.

These and other features of the heat exchanger 102 may also be shown in FIGS. 3-8. FIG. 3 is an isometric view of an example of a groundwater heat exchanger 102, in accordance with embodiments of the present disclosure. FIG. 4 is an isometric view of a top portion of the groundwater heat exchanger 102 of FIG. 3, and FIG. 5 is an isometric cross-sectional view of the top portion of the groundwater heat exchanger 102 shown in FIG. 4 taken generally along line 5-5, in accordance with embodiments of the present disclosure. FIG. 6 is a top isometric view of a bottom portion of the groundwater heat exchanger 102 of FIG. 3, in accordance with embodiments of the present disclosure. FIGS. 7 and 8 respectively are top and bottom isometric views of the bottom portion of the groundwater heat exchanger of FIG. 3 with a portion of a housing removed, in accordance with embodiments of the present disclosure. FIG. 9 is an isometric cross-sectional view of the bottom portion of the heat exchanger 102 of FIG. 6 taken generally along line 9-9, in accordance with embodiments of the present disclosure.

In some embodiments, the heat exchanger 102 includes a distributor 140 that may receive the loop fluid flow 112 through the port 130, and distribute the loop fluid flow 112 into proximal ends 141 of the heat exchange pipes 134 that are attached to the distributor 140 (FIGS. 2, 4 and 5). In some embodiments, the distributor 140 includes an interior chamber 142 (FIGS. 2 and 5) that is accessible through the port 130. The pipes 134 are each fluidically coupled to the chamber 142, such that a loop fluid flow 112 received from the port 130 flows into the chamber 142 and through the pipes 134, as indicated in FIG. 2.

In some embodiments, distal ends 143 of the pipes 134 are connected to a collector 144 having a chamber 146, as shown in FIGS. 2 and 7-9. A loop fluid flow 112 (FIG. 2) traveling through each of the pipes 134 is received within the chamber 146, and discharged through the port 132. A return pipe 148 may be connected to the port 132 to receive the loop fluid flow 112, and return the loop fluid flow 112 to the system 100, such as the heat pump 118, through the pipe 116B (FIGS. 1 and 2). Thus, the pipes 134 and the return pipe 148 of the heat exchanger 102 define loop fluid passageways through which the loop fluid flow 112 travels. Such loop fluid passageways form a portion of the ground loop 104 (FIG. 1).

In one embodiment, the return pipe 148 (e.g., a schedule 40 2-inch return pipe) extends through the distributor 140, as shown in FIGS. 2 and 5. A seal is formed between the return pipe 148 and the walls of the distributor 140, through which the pipe 148 extends, to limit access to the chamber 142 through the port 130 and the openings to the heat exchange pipes 134.

In one example, the distributor includes a top plate 150, a bottom plate 152 and a sidewall 154 connecting the top and bottom plates 150 and 152, and defining the interior chamber 142. A top plan view of an example of the top plate 150 is illustrated in FIG. 10, and a top plan view of examples of the bottom plate 152 is shown in FIGS. 11A and 11B. The top and bottom plates 150 and 152 may each have a diameter that is sized to allow the heat exchanger 102 to be inserted into a desired borehole 106, such as 5-8 inches, for example The top plate 150 may be 0.125 inch thick, and have openings 156 and 158, each of which may be offset 1.525 inches from the center of the plate 150. The opening 156 may accommodate or form the port 130, and the opening 158 may accommodate the return pipe 148.

The bottom plate 152 may be 0.125 inch thick, for example, and may include openings 160 corresponding to each of the ends 141 of the pipes 134. The pipes 134 may be welded at or within the openings 160, such the fluid flow 112 travels from the chamber 142 into the pipes 134, or vice versa. Additionally, the bottom plate 152 includes a central opening 162 for the return pipe 148 that is sealed against the return pipe 148. In one embodiment, the return pipe 148 may be coupled to a tubing section 163 having a double bend within the chamber 142 that transitions the return pipe 148 from a substantially central location at the opening 160 of the bottom plate 152, to the opening 158 in the top plate 150, as shown in FIG. 5.

The return pipe 148 may extend above the top plate 150 of the distributor 140, such as 3 inches above the top plate 150, as shown in FIG. 4. The portion of the return pipe 148 that extends above the top plate 150 may form a port 166 to which the pipe 116B connects and receives the loop fluid flow 112 from the collector 144.

The bottom plate 152 may be configured as necessary to accommodate the pipes 134. Thus, the plate 152 may have more or fewer openings 160 depending on the number of pipes 134. Additionally, while the openings 160 are angularly distributed around the return pipe 148, the openings 160 may also be set to different radial distances to accommodate more pipes. One example of an alternative to the twelve pipe configuration (e.g., twelve openings 160) of FIG. 11A, is the twenty pipe configuration for the plate 152 shown in FIG. 11B having twenty openings 160.

The collector 144 may be, for example, 3 inches tall, and comprise a top plate 170, a bottom plate 172, and a side wall 174 that joins the top and bottom plates 170 and 172 to define the interior chamber 146. The bottom plate 172 of the collector 144 may be a solid plate that may be, for example, 0.125 inch thick. The wall 174, along with the top plate 170 and the bottom plate 172 define the chamber 146. The side wall 174 may be, for example, 0.100 inch thick.

The top plate 170 of the collector 144 may be substantially identical to the bottom plate 152 of the distributor 140 shown in FIG. 11A or 11B. Thus, the top plate 170 includes openings 176 and 178 that are similar to the openings 160 and 162 of the bottom plate 152, respectively, as indicated in FIG. 9. Thus, the ends 143 of the pipes 134 are attached to the top plate 170 at the openings 176, and an end 179 of the return pipe 148 is connected to the top plate 170 at the central opening 178. This allows the loop fluid flows 112 to be discharged from the pipes 134 into the interior chamber 146 of the collector 144 through the openings 176, and then discharged from the interior chamber 146 into the return pipe 148 through the opening 178. The pipes 134 and the return pipe 148 may be welded to the top plate 170, or attached to the top plate 170 using another suitable technique.

In some embodiments, the heat exchanger 102 includes a housing 180 that contains the groundwater flow or flows 138 such that they travel around and alongside each of the pipes 134, as indicated in FIG. 2. For example, the pump 136 may drive the groundwater flows 138 into the housing 180, which contains the groundwater flows 138 such that they travel alongside each of the heat exchange pipes 134 to facilitate heat transfer between the groundwater flows 138 and the loop fluid flows 112 traveling through the pipes 134.

The pump 136 may be attached at a bottom end of the heat exchanger 102, where it drives the groundwater 110 into the housing 180 to form the groundwater flows 138, as indicated in FIGS. 1-3. The pump 136 may be located outside the housing 180 and attached to a groundwater feed pipe 182 that extends into the bottom end of the housing 180. The groundwater feed pipe 182 may having openings 184, through which the groundwater flows 138 are discharged into the bottom end of the housing 180, as shown in FIG. 2. In some embodiments, a seal (e.g., packer) is formed between the pipe 182 and the housing 180 to prevent the groundwater flows 138 from escaping through the bottom end of the housing 180.

The groundwater feed pipe 182 may be supported by the collector 144, such as through an attachment of the pipe 182 to the bottom plate 172. In some embodiments, the bottom plate 172 includes a fitting without a corresponding access opening to the interior cavity 146, such as a 2-inch female NPT welded to the center of the plate 172, to which the pipe 182 is attached.

The number, length, thickness and diameter of the pipes 134 may be selected based on the size of the bore hole 106, and a desired rate of heat exchange with the groundwater flows 138. In general, the longer the length of the pipes 134, the greater the opportunity for heat exchange between the loop fluid flows 112 within the pipes 134 and the groundwater flows 138 around the pipes 134. In one example, the pipes have a length of 20 feet and a diameter of 0.5 inch.

Components of the heat exchanger 102 may be formed of metal, such as stainless steel, titanium, etc., and/or non-metallic materials, such as plastic (e.g., polyvinyl chloride (PVC)). In some embodiments, the heat exchange pipes 134 are formed of metal to enhance the heat exchange between the loop fluid flows 112 and the groundwater flows 138. In some embodiments, the housing 180 is formed of a non-metallic material, such as PVC, to insulate the groundwater flows 138 from the environment surrounding the housing 180, and for ease of manufacture.

The housing 180 generally surrounds the heat exchange pipes 134. That is, the housing 180 includes at least one section that extends around a longitudinal axis of the pipes 134 to guide the groundwater flow 138 along the exterior of the pipes 134, as generally shown in FIG. 2. This operates to enhance the rate of heat exchange between the loop fluid flows 112 and the groundwater flows 138 through the pipes 134 relative to the rate of heat exchange that would occur without the housing 180 being present.

In some embodiments, the housing 180 includes a plurality of containment pipes 190 (FIG. 3), each of which surrounds one of the heat exchange pipes 134 and maintains the groundwater flows 138 in close proximity to the pipes 134 for further enhancement to the rate of heat transfer between the groundwater flows 138 and the loop fluid flows 112, as well as enhanced control over the heat transfer.

Figure 12:
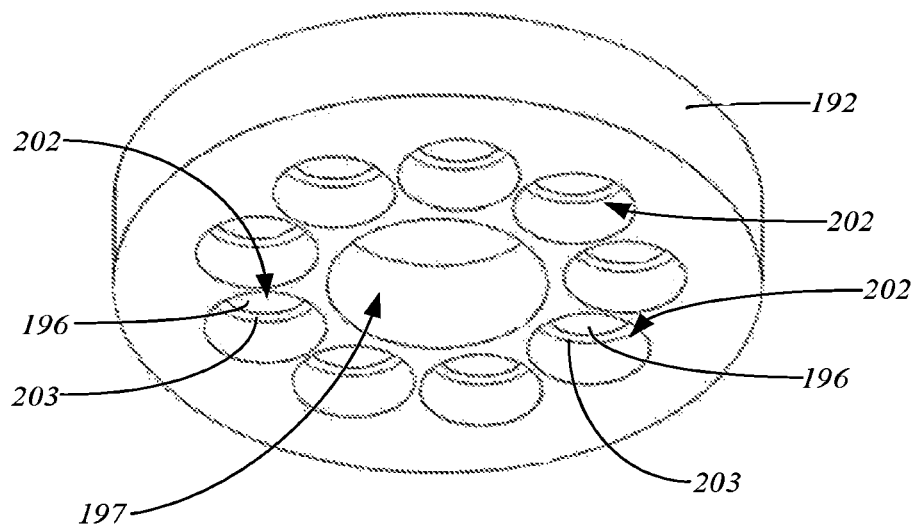
FIG. 12 is a bottom isometric view of an example of a top plate of a housing, in accordance with embodiments of the present disclosure.
Figure 13:
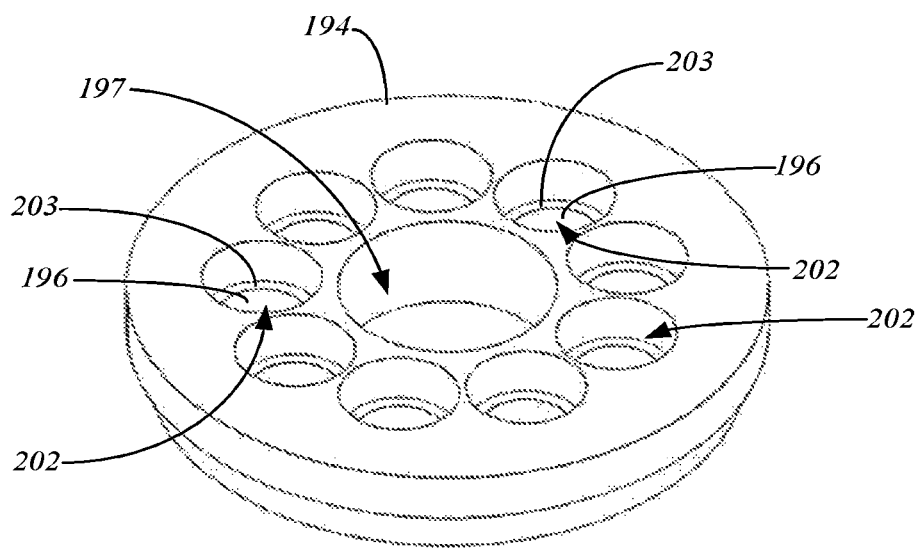
FIG. 13 is a top isometric view of an example of a bottom plate of a housing, in accordance with embodiments of the present disclosure.

In one example, the housing 180 includes a top plate or flange 192, as shown in FIGS. 4 and 5, and a bottom plate or flange 194, as shown in FIG. 7, that operate to support the containment pipes 190 in substantially concentric alignment (i.e., offset of less than 10% of the diameter of the containment pipe 190) and in close proximity to the heat exchange pipes 134. FIG. 12 is a bottom isometric view of an example of the top plate 192, and FIG. 13 is a top isometric view of an example of the bottom plate 194, in accordance with embodiments of the present disclosure. The top plate 192 may be positioned approximately 6 inches from the distributor 140, and the bottom plate 194 may be positioned approximately 6 inches from the collector 144, for example In some embodiments, the top and bottom plates 192 and 194 each include a plurality of openings 196. The ends 141 of the heat exchange pipes 134 extend through openings 196 in the top plate 192, and the ends 143 of the heat exchange pipes 134 extend through openings 196 in the bottom plate 194. The central opening 197 in the top plate 192 and the bottom plate 194 accommodate the central pipe 148, as shown in FIGS. 5 and 9.

In one embodiment, an end 198 of each containment pipe 190 is attached to the top plate 192 at one of the openings 196, and the opposing end 200 of each containment pipe 190 is attached to the bottom plate 194 at one of the openings 196, as shown in FIGS. 4 and 7. In one embodiment, the top plate 192 and the bottom plate 194 each include sockets 202 that are substantially concentrically aligned with the openings 196 (i.e., offset of less than 10% of the diameter of the opening 196), as shown in FIGS. 12 and 13. Each of the sockets 202 include a cylindrical bore having a diameter that is larger than the opening 196, and slightly larger than the outer diameter of the containment pipes. Thus, each socket 202 includes a shoulder portion 203 that extends around the corresponding opening 196. The ends 198 of the containment pipes 190 are each received within one of the sockets 202 of the top plate 192, and the ends 200 each received within one of the sockets 202 of the bottom plate 194. The degree to which the ends 198 and 200 are received in the sockets 202 is limited by the shoulder portions 203. The ends 198 and 200 may be bonded within the sockets 202 using any appropriate technique (e.g., adhesive bond, weld, etc.) to form an assembly through which the heat exchange pipes 134 extend.

In one example, the containment pipes 190 may comprise twelve 0.75 inch schedule 40 PVC pipes, and extend 228 inches between the top plate 192 and the bottom plate 194.

A suitable seal, such as an O-ring, may be used within each socket 202 to seal the junction between the plates 192 and 194 and the pipes 190.

Figure 14:
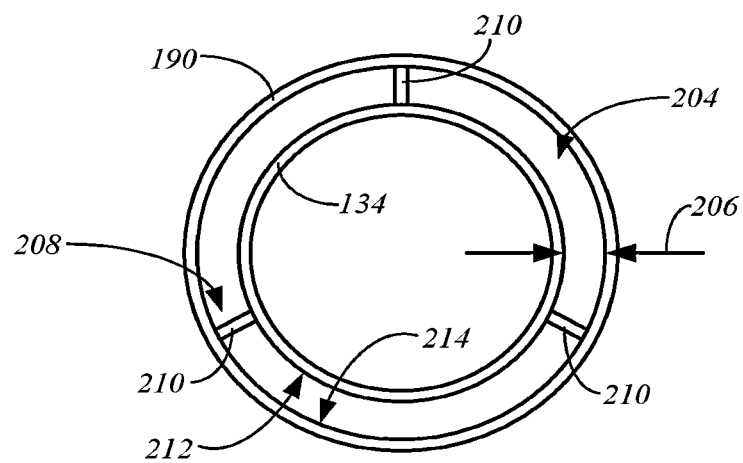
FIGS. 14 and 15 are simplified cross-sectional views of a containment pipe around a heat exchange pipe, in accordance with embodiments of the present disclosure.
Figure 15:
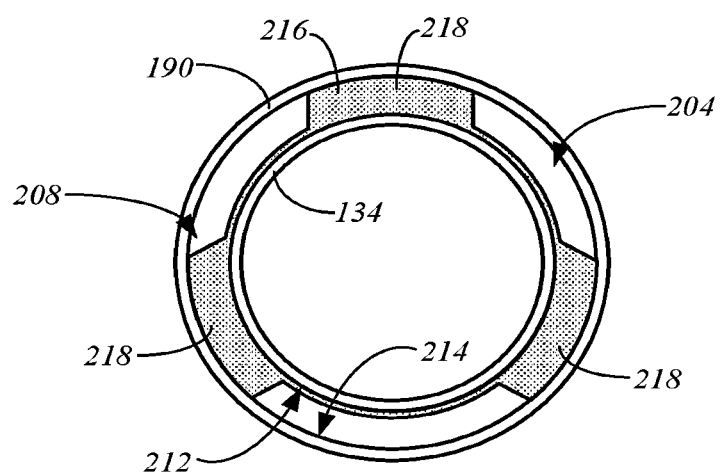

The substantially concentric alignment between the containment pipes 190 and the heat exchange pipes 134 results in an annular gap 204 between the containment pipes 190 and the heat exchange pipes 134, as shown in the simplified cross-sectional views of FIGS. 14 and 15. In some embodiments, the annular gap extends over a radial distance 206 of approximately 0.1-0.5 inch, such as 0.152 inch.

The annular gap 204, which is substantially uniform due to the concentric alignment of the pipes 190 and 134 allows for a greater rate of heat transfer between the groundwater flow 138 traveling through the gap 204 and around the pipe 134, and the loop fluid flow 112 traveling through the pipe 134, relative to the rate of heat transfer that would be possible if the pipes 190 and 134 were not substantially concentrically aligned.

Some embodiments include one or more spacers 208 that maintain the desired substantial concentric alignment between the heat exchange pipes 134 and the containment pipes 190 and, thus, a substantially uniform annular gap 204. In one embodiment, the spacers 208 include fins 210 that extend between an exterior surface 212 of each heat exchange pipe 134 and an interior surface 214 of the corresponding containment pipe 190, as illustrated in FIG. 14. In some embodiments, the fins 210 are angularly spaced about the heat exchange pipe 134 and prevent or limit radial movement (relative to a longitudinal axis of the pipes 134 and 190) of the pipe 134 relative to the pipe 190. The fins 210 may be formed of metal and may extend along the longitudinal axis of the heat exchange pipe 134. Thus, the fins 210 may enhance the heat transfer between the groundwater flow 138 in the annular gap 206 and the loop fluid flow 112 through the pipe 134.

The one or more spacers 208 may also take the form of washers 216 that may be fitted over the heat exchange pipes 134 at one or more locations along the pipes 134, such as indicated in the simplified cross-sectional view of FIG. 15. The washers 216 may include projections 218, such as three projections 218, that extend across the annular gap 204 between the exterior surface 212 of the pipe 134 to the interior surface 214 and operate to maintain substantially concentric alignment between the pipes 134 and 190. The washers 216 may be formed of metal, plastic, or another suitable material. The projections 218 may be configured to disrupt or turbulate the groundwater flow 138 through the annular gap 204, which may enhance the heat transfer between the groundwater flow 138 and the loop fluid flow 112 through the pipe 134.

In some embodiments, the housing 180 includes a cover member 220 that contains the collector 144 and directs the groundwater flows 138 from the pump 136 to the bottom plate 194 and the pipes 190, an example of which is shown in FIGS. 6 and 9. The cover member 220 may take on any suitable form, and may be sealed against the bottom plate 194 using any suitable technique, such as an O-ring. In one embodiment, the pump 136 is attached to a bottom of the cover member 220.

The heat exchanger 102 may include a connection between the distributor 140 and the housing 180 and/or a connection between the collector 144 and the housing 180, that operate to maintain a desired relative position and orientation between the housing 180, the distributor 140 and the collector 144. Additionally, the connections may also be used to maintain concentricity between the pipes 134 and the pipes 190. In one example, the connections are formed using one or more rods, dowels or cables that attach between the top plate 192 and the distributor 140, and/or the bottom plate 194 and the collector 144.

Figure 16:
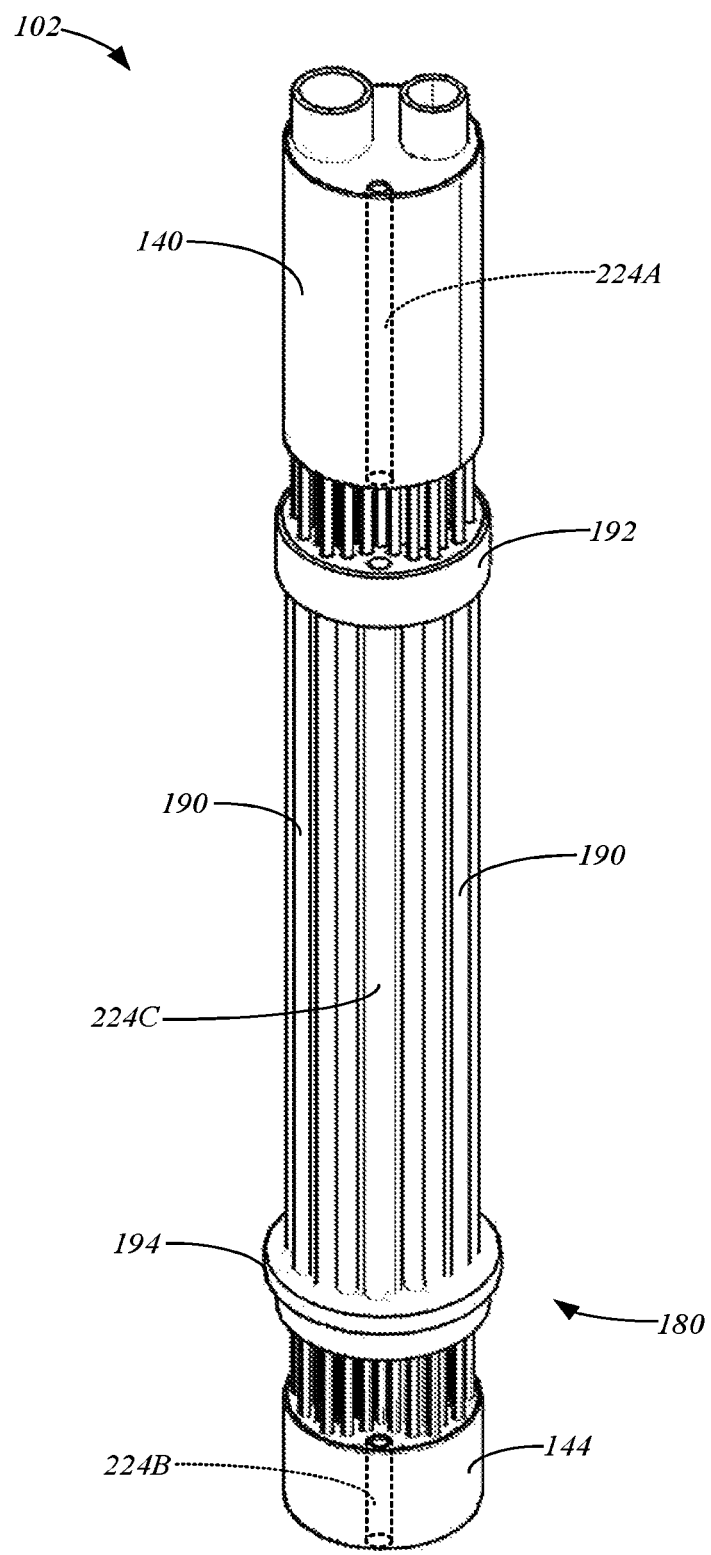
FIG. 16 is an isometric view of an example of a heat exchanger having cable tubes, in accordance with embodiments of the present disclosure.

Some embodiments of the heat exchanger 102 accommodate cabling for the pump 136, such as a power cable, that may extend to a suitable controller and/or power source located above the surface 108, to protect the cabling and prevent the cabling from disrupting an installation of the heat exchanger 102 within a borehole 106, such as by preventing the cabling from getting between an exterior of the heat exchanger 102 and a wall of the borehole 106, for example. In one embodiment, the heat exchanger 102 includes one or more cable tubes, generally referred to as cable tubes 224, through which the cabling may extend, as shown in the isometric view of the heat exchanger 102 (without the housing cover 220) shown in FIG. 16. For example, the heat exchanger 102 may include a cable tube 224A that extends through the distributor 140, a cable tube 224B that extends through the collector 144, and/or a cable tube 224C that extends between the top plate 192 and the bottom plate 194 of the housing 180.

The heat exchanger 102 in accordance with one or more of the embodiments described herein, can operate as a narrow approach temperature heat exchanger, meaning that the temperature difference across the exchanger 102 may be relatively very small compared to conventional heat exchangers. That is, conventional heat exchangers may have temperature differences across the exchanger of hundreds of degrees Fahrenheit, or at least many tens of degrees Fahrenheit, embodiments of the heat exchanger 102 may be configured to operate with temperature differences of less than 30 degrees Fahrenheit, and often below 15 degrees Fahrenheit. These temperature differences are often within the margin of error for conventional heat exchangers, hence, the heat exchanger 102 may be optimized differently.

Figure 17:
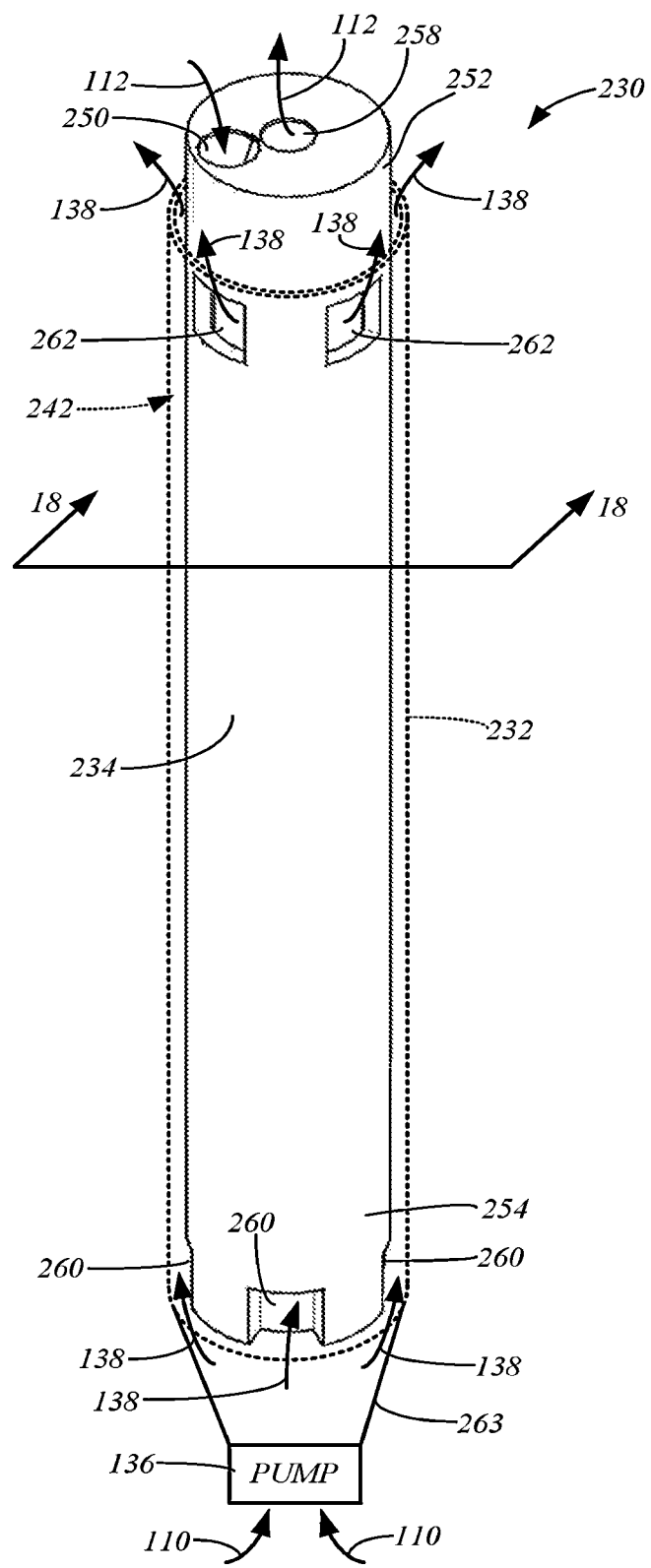
FIG. 17 is an isometric view of an example of a groundwater heat exchanger with an outer tube structure shown in phantom lines, in accordance with embodiments of the present disclosure.
Figure 18:
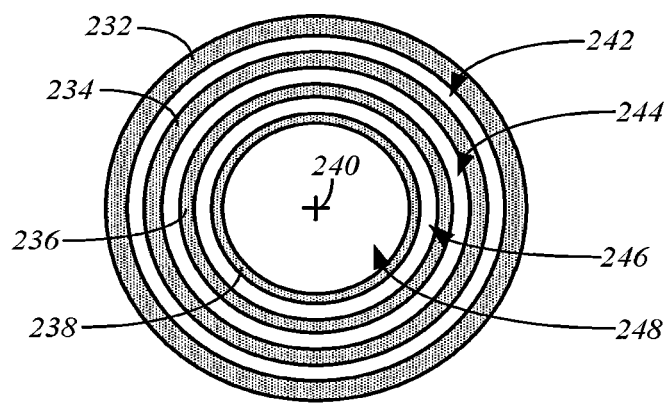
FIG. 18 is a simplified cross-sectional view of the groundwater heat exchanger of FIG. 17 taken generally along line 18-18, in accordance with embodiments of the present disclosure.
Figure 19:
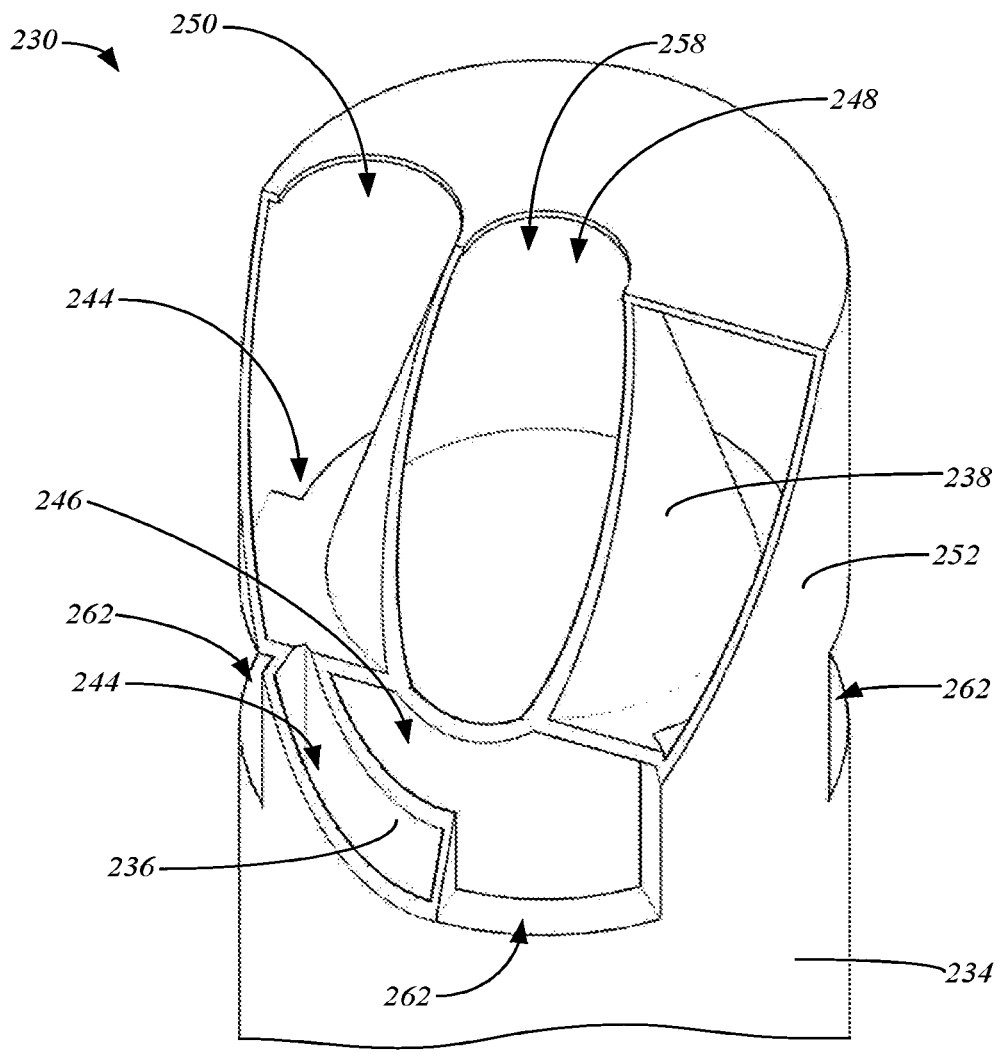
FIG. 19 is an isometric view of an upper portion of the groundwater heat exchanger of FIG. 17 with portions cut away to reveal interior features, in accordance with embodiments of the present disclosure.
Figure 20:
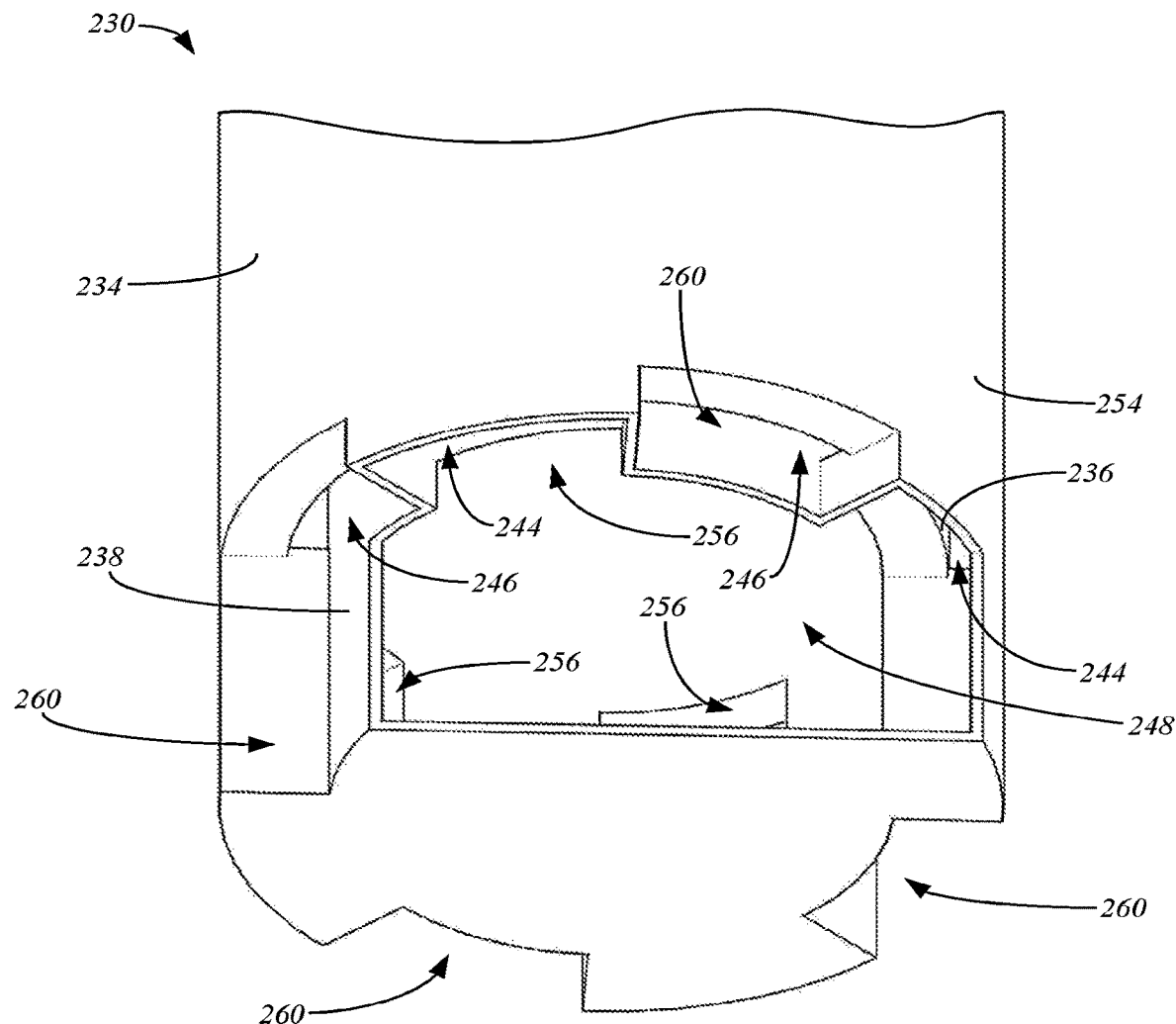
FIG. 20 is an isometric view of a bottom portion of the groundwater heat exchanger of FIG. 17 with portions cut away to reveal interior features, in accordance with embodiments of the present disclosure.

FIGS. 17-20 illustrate a groundwater heat exchanger 230 in accordance with embodiments of the present disclosure, which may be used in place of the groundwater heat exchanger 102 shown in FIG. 1. FIG. 17 is an isometric view of a groundwater heat exchanger 230 with an outer tube structure shown in phantom lines, in accordance with embodiments of the present disclosure. FIG. 18 is a simplified cross-sectional view of the groundwater heat exchanger of FIG. 17 taken generally along line 18-18, FIG. 19 is an isometric view of an upper portion of the groundwater heat exchanger 230 of FIG. 17 with portions cut away to reveal interior features, and FIG. 20 is an isometric view of a bottom portion of the groundwater heat exchanger 230 of FIG. 17 with portions cut away to reveal interior features, in accordance with embodiments of the present disclosure. The outer tube structure is not shown in FIGS. 19 and 20 to simplify the drawings.

In one embodiment, the heat exchanger 230 includes an outer tube structure 232 (shown in phantom lines in FIG. 17), a tube structure 234 within the tube structure 232, a tube structure 236 within the tube structure 234, and an inner tube structure 238 within the tube structure 232, as generally shown in FIG. 18. The tube structures 232, 234, 236 and 238 are connected together such that they have a fixed position relative to each other. The connections between the tube sections may comprise, for example, welded members that extend between the tube structures, and/or other suitable connections. At least a portion of the tube structures 232, 234, 236 and 238 may be substantially concentric (i.e., offset of less than 10% of the diameter of the tube structure 238) to a central or longitudinal axis 240 of the structures, such as shown in FIG. 18.

As with the heat exchanger 102, components of the heat exchanger 230 may be formed from metal (e.g., stainless steel, such as 304 stainless steel) and/or non-metal (e.g., plastic, such as PVC) materials. The outer tube structure 232 generally corresponds to the housing 180 of the heat exchanger 102, and may be non-metallic (e.g., PVC) to insulate the interior space from the remainder of the borehole in which the groundwater heat exchanger 230 is installed, such as the borehole 106 shown in FIG. 1. The tube structures 234, 236 and 238 may be metallic (e.g., stainless steel) to promote heat transfer.

The heat exchanger 230 operates in a similar manner to the heat exchanger 102 in that it includes a plurality of loop fluid passageways, through which the loop fluid flow 112 may travel, and a plurality of groundwater passageways, through which the groundwater flow 138 may travel, such that heat exchange may occur between the loop fluid flows 112 and the groundwater flows 138. In one example, a first channel 242 is formed between the outer tube structure 232 and the tube structure 234, a second channel 244 is formed between the tube structure 234 and the tube structure 236, a third channel 246 is formed between the tube structure 236 and the tube structure 238, and a fourth channel 248 is formed within the inner tube structure 238, as indicated in FIG. 18. The first channel 242 and the third channel 246 may be configured to operate as groundwater passageways containing the groundwater flows 138, and the second channel 244 and the fourth channel 248 may be configured to operate as loop fluid passageways containing the loop fluid flows 112. Each of the channels is generally isolated or sealed from the other channels, except at a top end or a bottom end of the heat exchanger 230, as discussed below.

In one embodiment, the heat exchanger 230 includes a port 250 at a top end 252 to the second channel 244 formed between the tube structures 234 and 236, as shown in FIGS. 17 and 19. The second channel 244 and the fourth channel 248 may be fluidically connected at a bottom end 254 of the heat exchanger 230, such as through suitable windows or radial passageways 256 that extend from the second channel 244 to the fourth channel 248 and bypass the third channel 246, as shown in FIG. 20. Thus, a loop fluid flow 112 received at the port 250, such as from the heat pump 118 through the pipe 116A (FIG. 1), enters the second channel 244 and flows through the second channel 244 toward the bottom end 254 where it is discharged from the second channel 244 to the fourth channel 248 through one or more of the radial passageways 256. The loop fluid flow 112 then travels through the fourth channel 248 to the top end 252 of the heat exchanger 230 where it may be discharged through a port 258 (FIGS. 17 and 19), and returned, for example, to the heat pump 118 (FIG. 1) through the pipe 116B.

As with the ports 130 and 166, the ports 250 and 258 may both be located on the top side of the heat exchanger 230 to allow for input and output of the loop fluid flow 112 on the same side, which is important for downhole use.

In one embodiment, the bottom end 254 of the heat exchanger 230 includes one or more openings or radial passageways 260 to the third channel 246, which is formed between the tube structure 236 and 238, and the top end of the heat exchanger 230 includes one or more openings or radial passageways 262 to the third channel 246, as indicated in FIGS. 17 and 20. Thus, a groundwater flow 138 may enter the third channel 246 through the radial passageways 260 at the bottom end 254, travel through the third channel 246 to the top end 252, where the groundwater flow 138 is discharged through the radial passageways 262, as indicated in FIG. 17.

Similarly, a groundwater flow 138 is allowed to enter the first channel 242, formed between the tube structure 232 and the tube structure 234, at the bottom end 254, and travels through the first channel 242 to the top end 252 where it may be discharged, as indicated in FIG. 17. As with the groundwater heat exchanger 102, the groundwater heat exchanger 230 may include a pump 136 that drives the groundwater flow or flows 138 through the first channel 242 and the third channel 246, such as with the aid of a housing cover 263, as indicated in FIG. 17. Alternatively, the groundwater flows may be generated through the heating of the groundwater 110 within the first channel 242 and the third channel 246 by the loop fluid flows 112 in the second channel 244 and the fourth channel 248.

In operation, as the loop fluid flow 112 travels through the second and fourth channels 244 and 248, and the groundwater flow travels 138 through the first and third channels 242 and 246, heat transfer occurs between the flows 112 and 138. Thus, the loop fluid flow 112 traveling through the second channel 244 transfers heat through the second tube structure 234 with the groundwater flow 138 traveling through the first channel 242, and transfers heat through the third tube structure 236 with the groundwater flow 138 traveling through the third channel 246. Additionally, the loop fluid flow 112 traveling through the fourth channel 248 within the inner tube structure 238 transfers heat through the inner tube structure 238 with the groundwater flow traveling 138 through the third channel 246.

Figure 21:
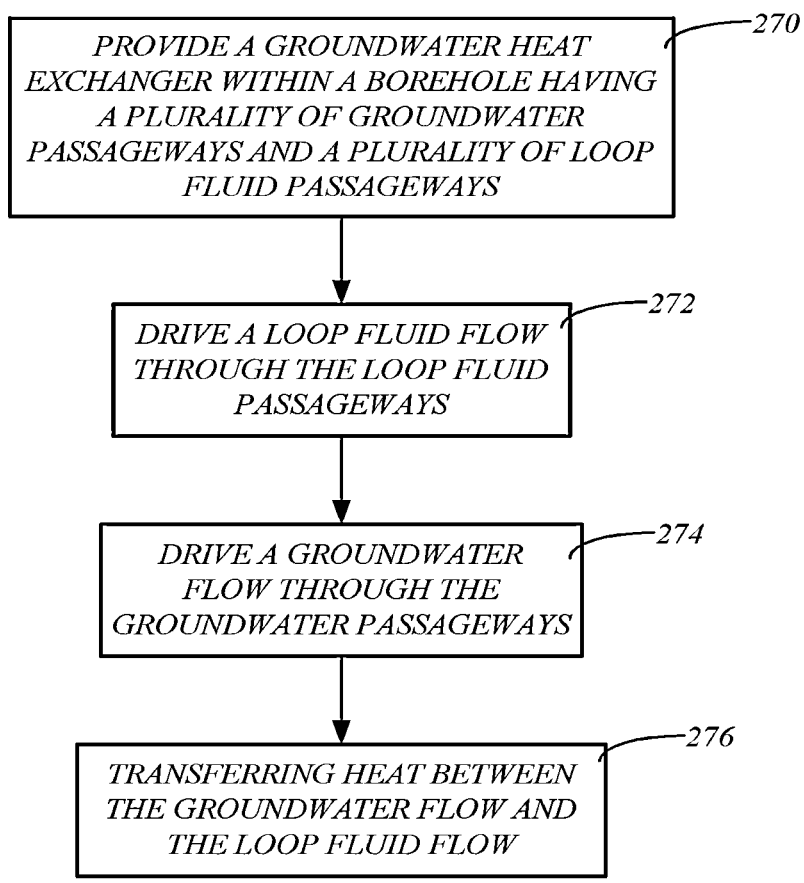
FIG. 21 is a flowchart illustrating an example of a method of operating a groundwater heat exchanger to exchange heat with one or more loop fluid flows, in accordance with embodiments of the present disclosure.

Some embodiments of the present disclosure are directed to a method of using or operating the groundwater heat exchanger to exchange heat with one or more loop fluid flows 112. FIG. 21 is a flowchart illustrating one example of the method, in accordance with embodiments of the present disclosure.

At 270 of the method, a groundwater heat exchanger, such as the groundwater heat exchanger 102 or the groundwater heat exchanger 230 formed in accordance with one or more embodiments described herein, is provided within a borehole 106, as generally illustrated in FIG. 1. The groundwater heat exchanger includes a plurality of groundwater passageways and a plurality of loop fluid passageways. For example, the heat exchanger 102 includes a plurality of groundwater passageways formed between the containment pipes 190 and the heat exchange pipes 134 and a plurality of loop fluid passageways within the heat exchange pipes 134, and the heat exchanger 230 includes a plurality of groundwater passages formed by the first channel 242 and the third channel 246 and a plurality of loop fluid passageways formed by the second channel 244 and the fourth channel 248.

At 272 of the method, a loop fluid flow 112 is driven through the plurality of loop fluid passageways. This step may be performed using a loop fluid pump 114, as shown in FIG. 1.

At 274 of the method, a groundwater flow 138 is driven through the groundwater passageways. This step may be performed using a submersible pump 136, as shown in FIGS. 1-3 and 17, or through the heating of the groundwater 110 by the loop fluid flows 112.

At 276 of the method, heat is transferred between the groundwater flow 138 traveling through the groundwater passageways, and the loop fluid flow 112 traveling through the loop fluid passageways.

Although the embodiments of the present disclosure have been described with reference to preferred embodiments, workers skilled in the art will recognize that changes may be made in form and detail without departing from the spirit and scope of the present disclosure.

What is claimed is:

1. A groundwater heat exchanger comprising:
a distributor including a first interior chamber and a first port to the first interior chamber;
a collector including a second interior chamber and a second port to the second interior chamber;
a plurality of heat exchange pipes, each heat exchange pipe having a first end attached to the distributor and a second end attached to the collector, and defining a fluid passageway between the first and second interior chambers; and
a housing including a plurality of containment pipes each surrounding one of the plurality of heat exchange pipes and defining a groundwater passageway that extends along an exterior of each of the heat exchange pipes within a gap between each heat exchange pipe and the containment pipe through which it extends that is configured to receive a groundwater flow,
wherein:
a loop fluid flow received at the first port flows into the first interior chamber, then flows from the first interior chamber to the second interior chamber through the plurality of heat exchange pipes, and flows from the second interior chamber out the second port; and
the housing includes:
a first plate comprising a plurality of first sockets and a plurality of first openings through the first plate, wherein:
each first opening is substantially concentric to one of the first sockets;
a first end of each of the containment pipes is received within one of the first sockets; and
the first end of each of the heat exchange pipes extends through one of the containment pipes and one of the first openings; and
a second plate comprising a plurality of second sockets and a plurality of second openings through the second plate, wherein:
each second opening is substantially concentric to one of the second sockets;
a second end of each of the containment pipes is received within one of the second sockets; and
the second end of each of the heat exchange pipes extends through one of containment pipes and one of the second openings.

2. The groundwater heat exchanger according to claim 1, further comprising one or more spacers positioned within each gap, each spacer configured to position the containment pipe in substantially concentric alignment with the heat exchange pipe extending therethrough.

3. A groundwater heat exchanger comprising:
a distributor including a first interior chamber and a first port to the first interior chamber;
a collector including a second interior chamber and a second port to the second interior chamber;
a plurality of heat exchange pipes, each heat exchange pipe having a first end attached to the distributor and a second end attached to the collector, and defining a fluid passageway between the first and second interior chambers; and
a housing including a plurality of containment pipes each surrounding one of the plurality of heat exchange pipes and defining a groundwater passageway that extends along an exterior of each of the heat exchange pipes within a gap between each heat exchange pipe and the containment pipe through which it extends that is configured to receive a groundwater flow,
wherein:
a loop fluid flow received at the first port flows into the first interior chamber, then flows from the first interior chamber to the second interior chamber through the plurality of heat exchange pipes, and flows from the second interior chamber out the second port;
the groundwater heat exchanger includes a return pipe that is connected to the second port and extends through the housing and the first interior chamber of the distributor;
and the loop fluid flow travels from the second interior chamber through the return pipe, which extends through the first interior chamber.

4. The groundwater heat exchanger according to claim 3, further comprising a first cable tube extending through the first interior chamber of the distributor, and a second cable tube extending through the second interior chamber of the collector.

5. The groundwater heat exchanger according to claim 1, wherein the collector is contained within the housing.

6. A groundwater heat exchanger comprising:
a distributor including a first interior chamber and a first port to the first interior chamber;
a collector including a second interior chamber and a second port to the second interior chamber;
a plurality of heat exchange pipes, each heat exchange pipe having a first end attached to the distributor and a second end attached to the collector, and defining a fluid passageway between the first and second interior chambers; and
a housing including a plurality of containment pipes each surrounding one of the plurality of heat exchange pipes and defining a groundwater passageway that extends along an exterior of each of the heat exchange pipes within a gap between each heat exchange pipe and the containment pipe through which it extends that is configured to receive a groundwater flow,
wherein:
a loop fluid flow received at the first port flows into the first interior chamber, then flows from the first interior chamber to the second interior chamber through the plurality of heat exchange pipes, and flows from the second interior chamber out the second port;
the housing has a first end and a second end;
the heat exchanger includes a pump configured to drive the groundwater flow such that it travels from the second end of the housing through the groundwater passageway along the heat exchange pipes, and out the first end of the housing; and
the groundwater heat exchanger comprises a groundwater feed pipe that is supported by the collector and extends away from the distributor, wherein the pump is configured to drive the groundwater flow into the second end of the housing through the groundwater feed pipe.

7. A system comprising:
the groundwater heat exchanger of claim 6; and
a loop fluid pump configured to drive a loop fluid flow through the first port, the first interior chamber, the plurality of heat exchange pipes, the second interior chamber and the second port.

8. A method of exchanging heat between a loop fluid flow and groundwater comprising:
providing a groundwater heat exchanger within a borehole, the groundwater heat exchanger comprising:

a distributor including a first interior chamber and a first port to the first interior chamber;

a collector including a second interior chamber and a second port to the second interior chamber;

a plurality of heat exchange pipes, each heat exchange pipe having a first end attached to the distributor and a second end attached to the collector, and defining a loop fluid passageway between the first and second interior chambers;

a housing including a plurality of containment pipes, wherein each of the plurality of heat exchange pipes extends through one of the containment pipes, and a gap between each heat exchange pipe and the containment pipe through which it extends forms a portion of a groundwater passageway; and a groundwater pump;

driving the loop fluid flow through the distributor, the plurality of heat exchange pipes and the collector using a loop fluid pump; and driving a groundwater flow through the groundwater passageway using the groundwater pump, wherein:

heat is transferred between the loop fluid flow traveling through the plurality of heat exchange pipes and the groundwater flow traveling through the groundwater passageway; and the housing includes:

a first plate comprising a plurality of first sockets and a plurality of first openings through the first plate, wherein:

each first opening is substantially concentric to one of the first sockets;

a first end of each of the containment pipes is received within one of the first sockets; and the first end of each of the heat exchange pipes extends through one of the first openings; and a second plate comprising a plurality of second sockets and a plurality of second openings through the second plate, wherein:

each second opening is substantially concentric to one of the second sockets;

a second end of each of the containment pipes is received within one of the second sockets; and the second end of each of the heat exchange pipes extends through one of the second openings.

9. A method of exchanging heat between a loop fluid flow and groundwater comprising:

providing a groundwater heat exchanger within a borehole, the groundwater heat exchanger comprising:

a distributor including a first interior chamber and a first port to the first interior chamber;

a collector including a second interior chamber and a second port to the second interior chamber;

a plurality of heat exchange pipes, each heat exchange pipe having a first end attached to the distributor and a second end attached to the collector, and defining a loop fluid passageway between the first and second interior chambers;

a housing including a plurality of containment pipes, wherein each of the plurality of heat exchange pipes extends through one of the containment pipes, and a gap between each heat exchange pipe and the containment pipe through which it extends forms a portion of a groundwater passageway; and a groundwater pump;

driving the loop fluid flow through the distributor, the plurality of heat exchange pipes and the collector using a loop fluid pump; and driving a groundwater flow through the groundwater passageway using the groundwater pump, wherein:

heat is transferred between the loop fluid flow traveling through the plurality of heat exchange pipes and the groundwater flow traveling through the groundwater passageway; and the heat exchanger comprises one or more spacers within each of the gaps, each spacer configured to position each containment pipe in substantially concentric alignment with the heat exchange pipe extending therethrough.

* * * * *